US007755837B2

(12) United States Patent
Yamamoto

(10) Patent No.: US 7,755,837 B2
(45) Date of Patent: Jul. 13, 2010

(54) IMAGE DISPLAY APPARATUS

(75) Inventor: Akira Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 11/834,430

(22) Filed: Aug. 6, 2007

(65) Prior Publication Data

US 2008/0212195 A1 Sep. 4, 2008

(30) Foreign Application Priority Data

Aug. 11, 2006 (JP) ............... 2006-220223

(51) Int. Cl.
*G02B 27/14* (2006.01)
(52) U.S. Cl. ............... 359/632; 359/631; 359/633
(58) Field of Classification Search ............. 359/631, 359/633
See application file for complete search history.

(56) References Cited

U.S. PATENT DOCUMENTS 5,701,132 A  12/1997  Kollin et al. ............ 345/8

6,771,423 B2 * 8/2004  Geist ................... 359/630

FOREIGN PATENT DOCUMENTS

JP          9-171147          6/1997

\* cited by examiner

*Primary Examiner*—Joseph Martinez
(74) *Attorney, Agent, or Firm*—Fitzpatrick, Cella, Harper & Scinto

(57) ABSTRACT

An image display apparatus is disclosed in which the position of an exit pupil can follow the movement of a pupil of an observer even with a small size. The apparatus includes an image-forming element which forms an image, an ocular unit which causes light from the image-forming element to form an exit pupil, and an optical element which reflects the light from the image-forming element toward the ocular unit. The optical element has an optical power and is rotated about a focal point of the ocular unit on the side closer to the image-forming element to move the exit pupil.

8 Claims, 36 Drawing Sheets

IMAGE DISPLAY APPARATUS

BACKGROUND OF THE INVENTION

The present invention relates to an image display apparatus which allows a user to observe an image formed by an image-forming element through an ocular unit (eyepiece).

Image display apparatuses such as a head-mounted display and an electronic viewfinder of a digital camera typically include a two-dimensional display element such as a transmissive liquid crystal element, a reflective liquid crystal element, and an organic EL element. In many image display apparatuses, the two-dimensional display element is used in combination with an ocular unit to allow observation of a displayed image as a virtual image. In addition, retina projection image display apparatuses have been proposed in which an image is formed directly on the retina of an eye of an observer by using a scanning element for two-dimensionally scanning light from a light source.

In such an image display apparatus, especially having a wide field of view for observation, when an observer widely moves his eyeballs in attempting to observe the end portion of the field of view, his pupils are also moved greatly in association with the eyeball movement. If the diameter of the exit pupil of the image display apparatus is small, a light flux emerging therefrom proceeds out of the pupils to prevent the observation of the image. To avoid this, the ocular unit is typically designed to provide the exit pupil having a large diameter. In a scanning image display apparatus which tends to have a small exit pupil in principle, an enlarging means such as a lens array and a diffusing plate is used to increase the divergence angle of an emerging light flux (see U.S. Pat. No. 5,701,132).

When the exit pupil having a large diameter is provided, the diameter is set to a value equal to or larger than the diameter of the pupils of an observer. Thus, if the pupils are moved with the eyeball movement, an emerging light flux always enters the pupils to allow an observer to observe an image without vignetting. However, as the diameter of the exit pupil is larger, the proportion of light entering the pupils of an observer is smaller, resulting in a darker image to be observed.

In an image display apparatus as described above including a diffusing plate disposed on an intermediate image-forming plane, when a user observes an enlarged image through an ocular unit, the pattern of the diffusing plate is observed over the displayed image to reduce the quality of the observed image.

In an image display apparatus having the exit pupil with a large diameter, if an observer has a problem in his eyesight adjusting function such as short sight, long sight, astigmatism, and presbyopia, the observer must wear glasses or contact lenses in observing an image with an image display apparatus. This makes the observer feel intrusive.

To address this, an image display apparatus has been proposed in which the diameter of an exit pupil is set to a small value and an observer can see an image with the Maxwellian view. In the Maxwellian view, light from a light source is once converged by a lens to the pupils of an observer and then caused to enter the eyeballs to allow the observer to see the light. When an optical system for enabling image observation with the Maxwellian view is used, the observer can see an image with high resolution regardless of the eyesight of his eyes. This is because a thin light flux enters the pupils and thus the image observation is not affected by the eyesight condition such as short sight, long sight, astigmatism, and presbyopia. In addition, the light emerging from a light source can be effectively caused to enter the pupils to allow observation of a very bright image.

Even when the Maxwellian view is used, however, the emerging light flux does not enter the pupils and the observation of an image is prevented if an eyeball movement occurs or if the relative positions of the observer and the image display apparatus are changed.

To solve the problems, Japanese Patent Laid-Open No. 9(1997)-171147 has proposed an image display apparatus in which a variable-angle prism is placed at the focal point of an ocular unit and the angle of the variable-angle prism is changed to move the exit pupil.

In the image display apparatus disclosed in Japanese Patent Laid-Open No. 9(1997)-171147, however, when an image with a wide viewing angle is assumed, the pupils of an observer who attempts to see the end portion of the image are moved widely. If the angle of the variable-angle prism is greatly changed in association with that large moving amount, significant distortion occurs in the image to make the observer feel strange. In addition, a large variable amount of the angle of the variable-angle prism increases the size of the variable-angle prism to cause an increase in the overall size of the system.

BRIEF SUMMARY OF THE INVENTION

The present invention provides an image display apparatus and an image-forming system in which the position of an exit pupil can follow the movement of the pupil of an observer even with a small size.

An image display apparatus as an aspect of the present invention includes an image-forming element which forms an image, an ocular unit which causes light from the image-forming element to form an exit pupil, and an optical element which reflects the light from the image-forming element toward the ocular unit. The optical element has an optical power and is rotated about a focal point of the ocular unit on the side closer to the image-forming element to move the exit pupil.

An image display system as another aspect of the present invention includes the image display apparatus, and an image supply apparatus which supplies image information to the image display apparatus.

Other aspects and features of the present invention will become apparent from the following description and the attached drawings.

DESCRIPTION OF THE EMBODIMENTS

Embodiments of the present invention will hereinafter be described with reference to the drawings.

Embodiment 1

Figure 1:
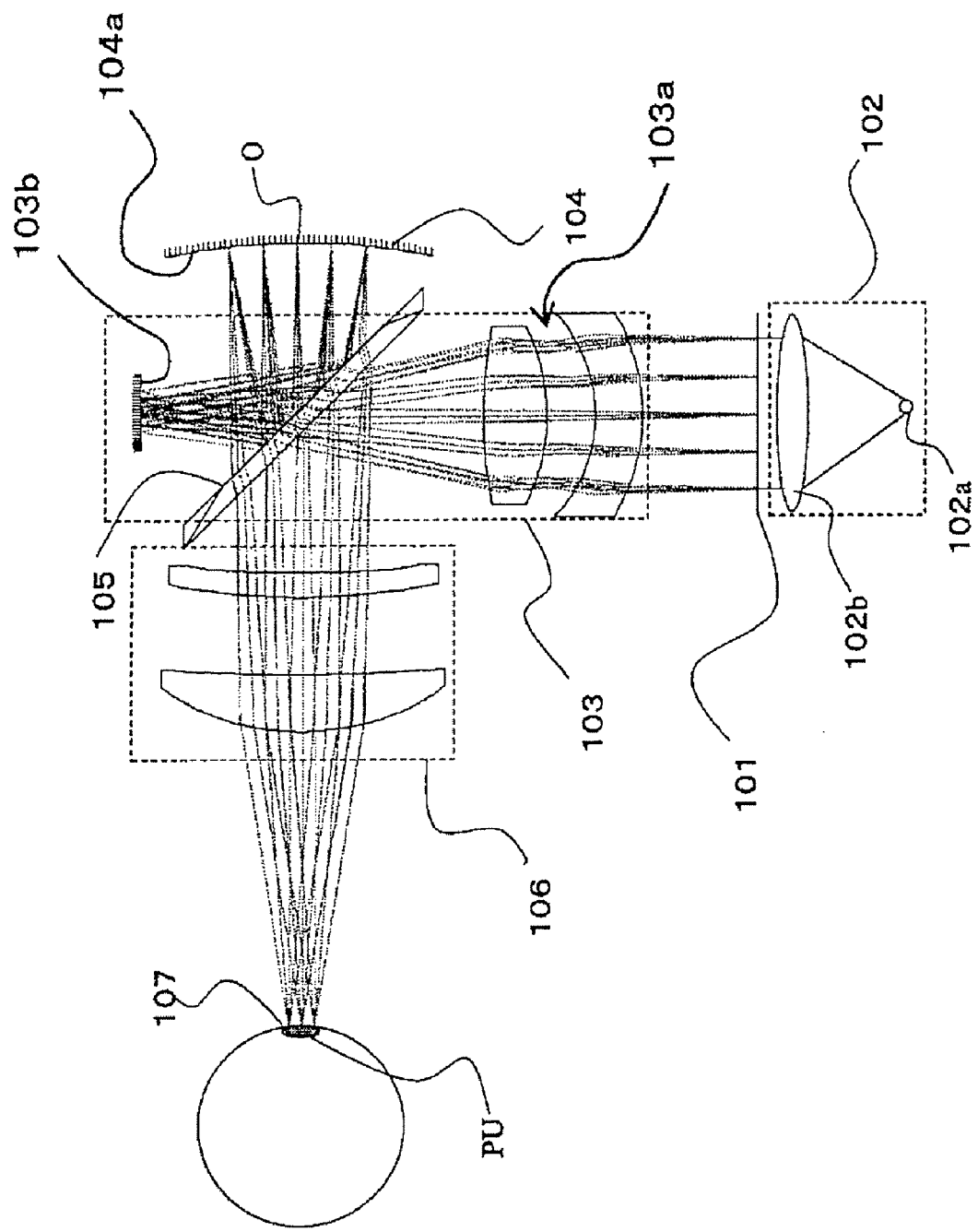
FIG. 1 is a vertical section view showing the configuration of optical systems of an image display apparatus which is Embodiment 1 of the present invention.

FIG. 1 is a vertical section view showing an image display apparatus which is Embodiment 1 of the present invention. The image display apparatus of Embodiment 1 enlarges an image formed by an image-forming element 101 and allows an observer to see the enlarged image as a virtual image through an ocular unit (eyepiece) 106.

The image-forming element 101 has an image-forming plane on which a two-dimensional image is formed (displayed), and is illuminated by a parallel light flux from an illumination unit 102. In Embodiment 1, a transmissive liquid crystal panel is used as the image-forming element 101. Alternatively, a reflective liquid crystal panel, an organic EL (electroluminescence) element which has a limited numerical aperture (NA) of emerging light may be used.

The illumination unit 102 is formed of a point light source 102a and an illumination optical system 102b. The light flux emerges from the illuminated image-forming element 101 and is condensed by a condensing optical system 103. The condensing optical system 103 includes at least one positive lens 103a and a reflective surface 103b. A half mirror 105 is placed between the positive lens 103a and the reflective surface 103b.

The light flux from the image-forming element 101 passes through the positive lens 103a and the half mirror 105 and is reflected by the reflective surface 103b. The light flux after the reflection by the reflective surface 103b is reflected by the half mirror 105 and then enters a light-flux-deflecting unit (optical element) 104.

The light-flux-deflecting unit 104 has a reflective surface 104a having a positive optical power (the optical power means the reciprocal of the focal length). The light flux after the reflection by the light-flux-deflecting unit 104 is transmitted through the half mirror 105 and enters the ocular unit 106. The light flux emerges from the ocular unit 106 and forms an exit pupil 107. The exit pupil 107 optically serves as a conjugate point of the point light source 102a.

A pupil PU of an observer is placed in the area where the exit pupil 107 is formed, so that the observer can see an enlarged virtual image (hereinafter referred to as an observation image in Embodiment 1) of the image formed by the image-forming element 101.

Figure 2:
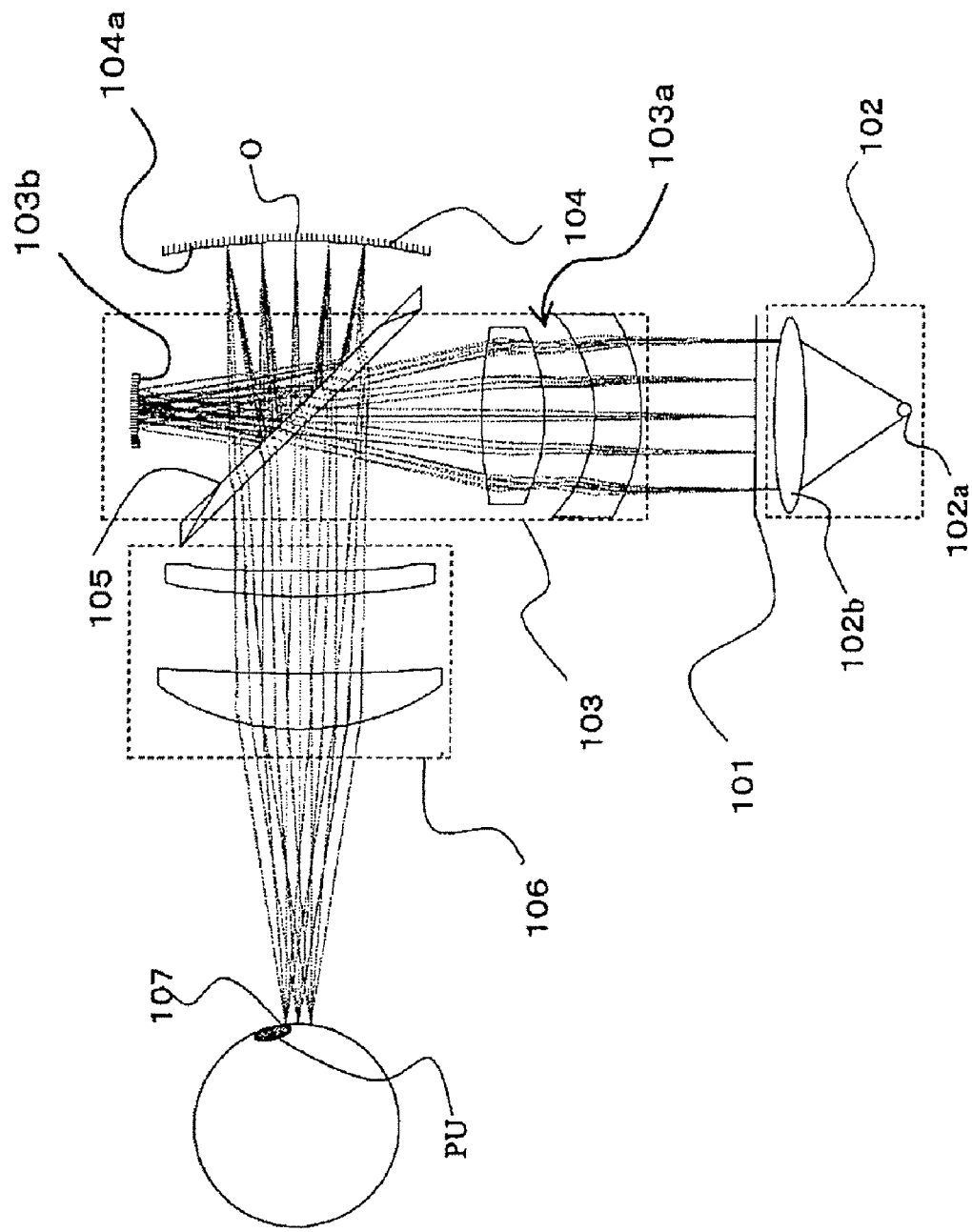
FIG. 2 is a diagram for explaining a situation in which an eyeball movement prevents observation of an image in optical systems of Embodiment 1.

FIG. 1 shows a situation which the position of the exit pupil 107 coincides with the position of the pupil PU of the observer. On the other hand, FIG. 2 shows a situation in which the position of the pupil PU is shifted upward from the position of the exit pupil 107 due to an eyeball movement of the observer or a change in the relative positions of the face of the observer and the image display apparatus. Since the diameter of the exit pupil 107 is smaller than the diameter of the pupil PU in Embodiment 1, a slight shift of the position of the pupil PU from the position shown in FIG. 1 prevents the light from entering the pupil PU unless the light-flux-deflecting unit 104 is rotated as later described. The observer cannot see the image in the situation shown in FIG. 2.

Figure 3:
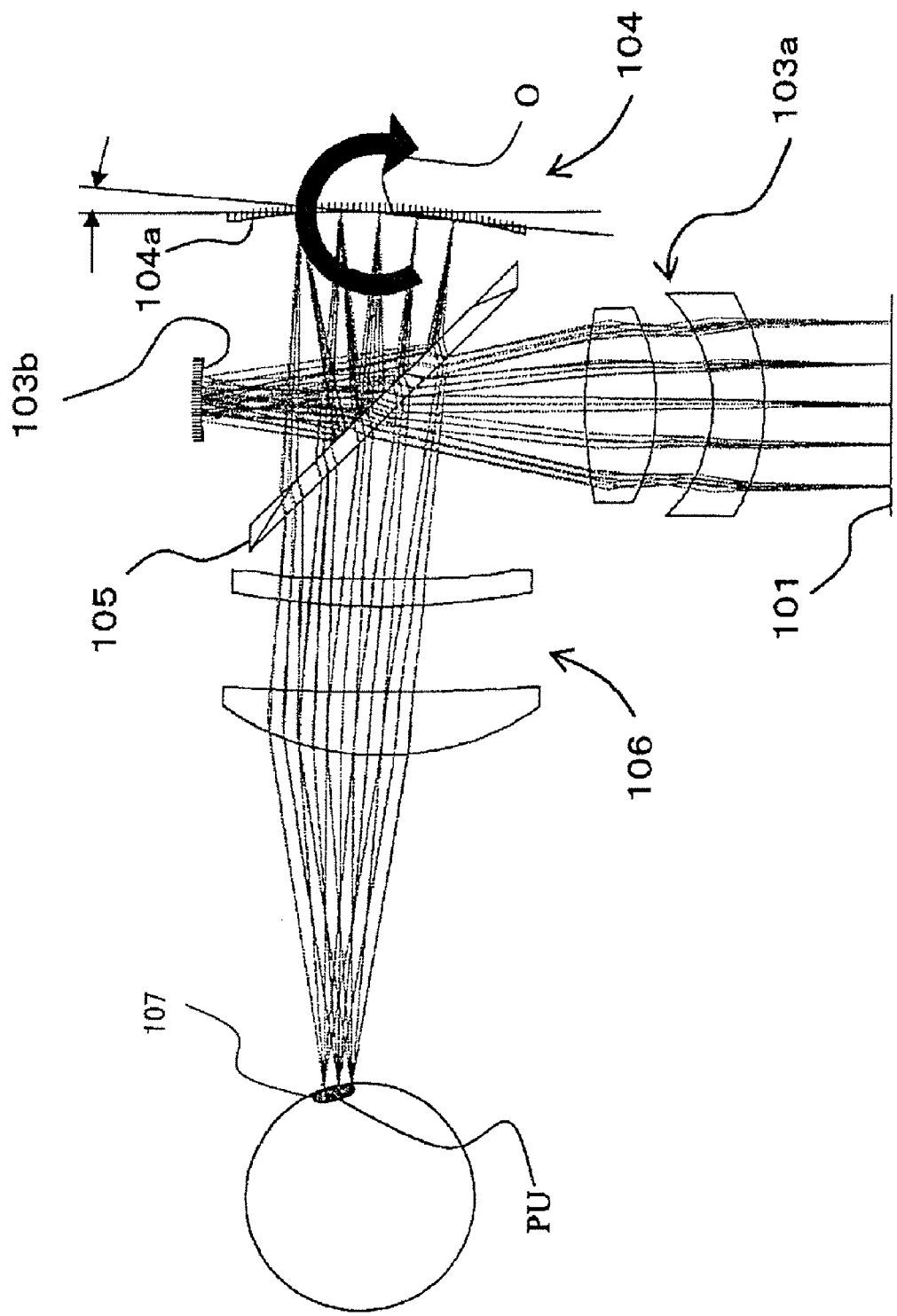
FIG. 3 is a diagram for explaining the movement of an exit pupil in Embodiment 1.

To address this, in Embodiment 1, the light-flux-deflecting unit 104 is rotated about a point O by a small angle as shown in FIG. 3. This changes the proceeding direction of the light flux reflected by the reflective surface 104a toward the ocular unit 106. As a result, the position of the exit pupil 107 formed through the ocular unit 106 is changed from the position shown in FIG. 1. The direction and angle of the rotation of the light-flux-deflecting unit 104 can be controlled such that the position of the exit pupil 107 coincides with (follows) the position of the pupil PU, thereby allowing the observer to see the image even when the observer moves the pupil PU.

While FIG. 3 shows the light-flux-deflecting unit 104 rotated in a plane in parallel with the sheet of FIG. 3 to move the exit pupil 107 in that plane, the light-flux-deflecting unit 104 may be rotated in a plane perpendicular to the sheet of FIG. 3 to move the exit pupil 107 in that plane.

Description will hereinafter be made of the principle and advantages in rotating the light-flux-deflecting unit 104 to move the exit pupil 107 with reference to FIGS. 4A to 4D which schematically show the optical systems in Embodiment 1 in developed form.

Figure 4A:
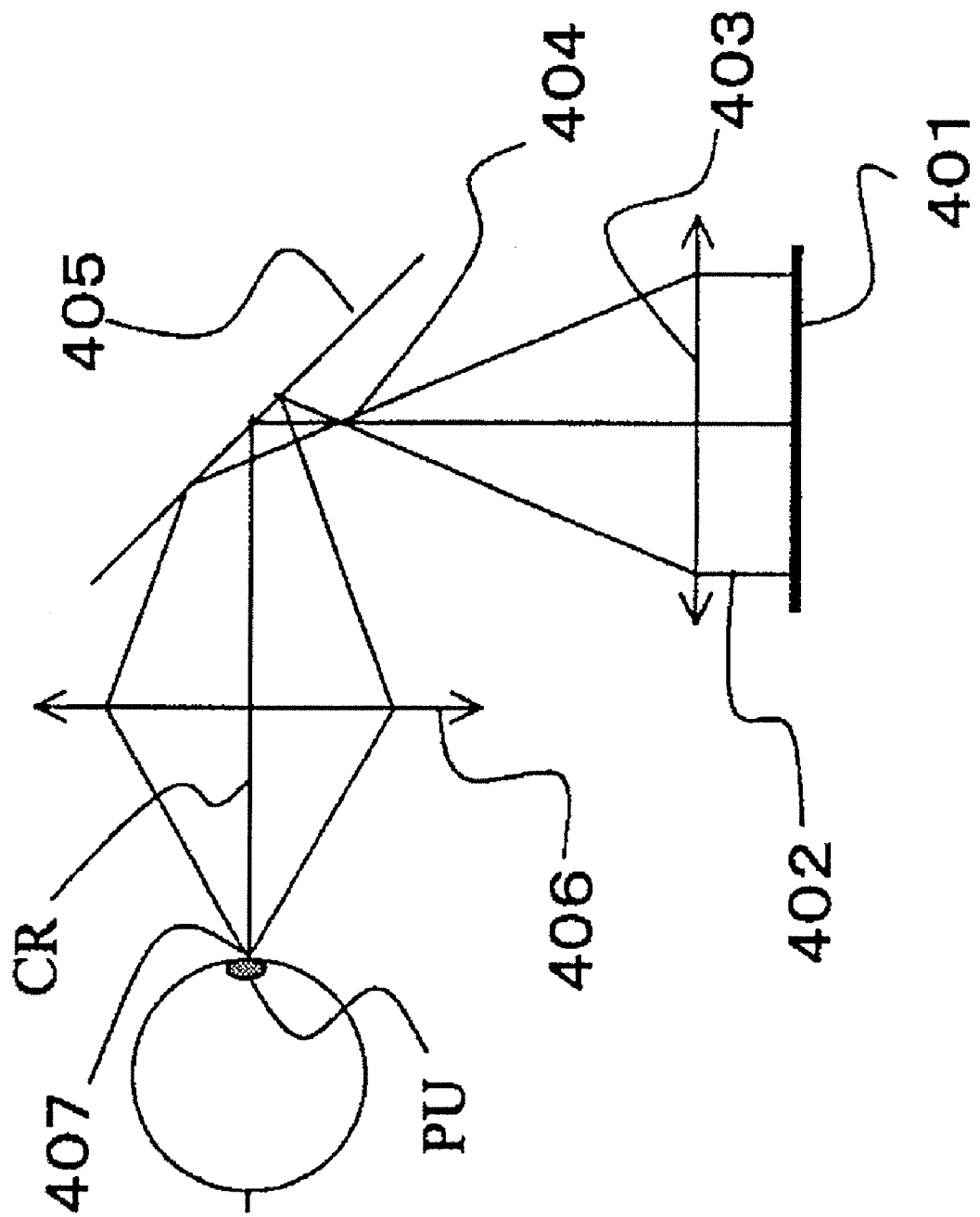
FIG. 4A schematically shows the optical systems of Embodiment 1.

In FIG. 4A, a light flux 402 emerges from an image-forming element 401, forms a pupil 404 by a condensing optical system 403, and enters an ocular unit 406 via a light-flux-deflecting unit 405. The light flux forms an exit pupil 407 through the ocular unit 406.

Figure 4B:
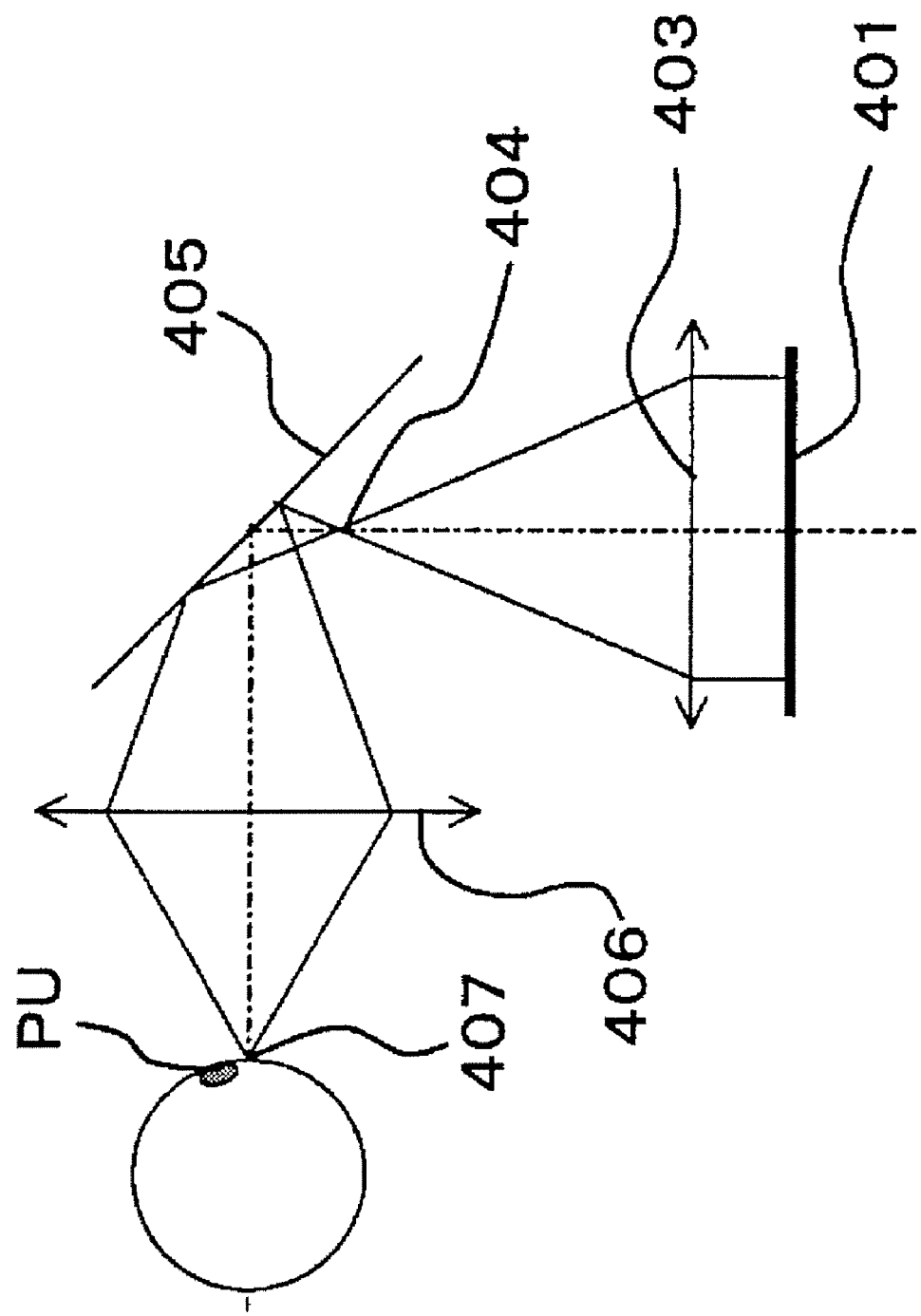
FIG. 4B is a diagram for explaining a situation in which an eyeball movement prevents observation of an image in Embodiment 1.
Figure 4C:
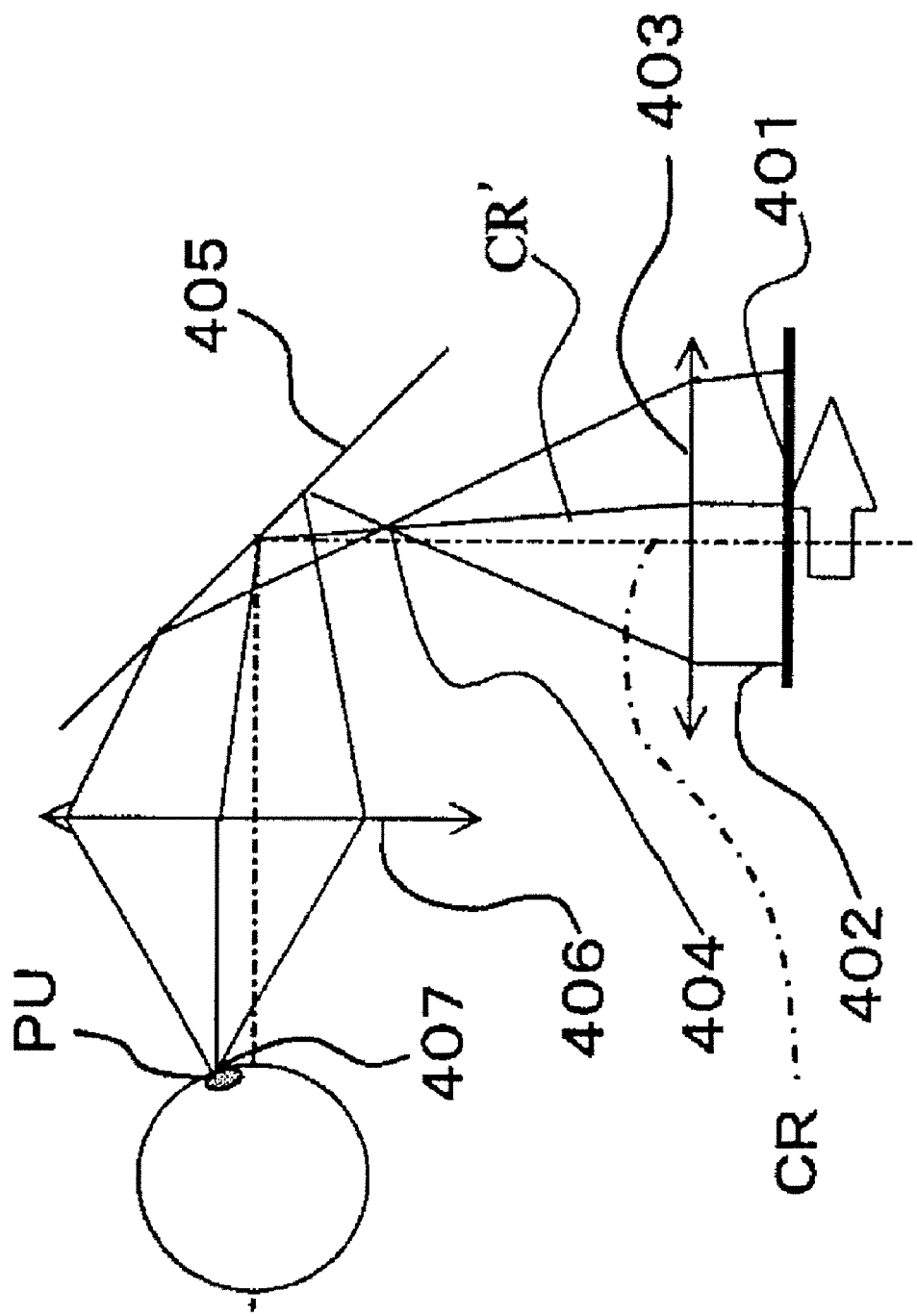
FIG. 4C schematically shows the movement of the exit pupil when an image-forming element is moved.

When the pupil PU of the observer is moved upward as shown in FIG. 4B, one of methods for moving the exit pupil 407 upward in association with the movement of the pupil PU is shown in FIG. 4C. Specifically, the position of the image-forming element 401 is moved to the right to move the pupil 404 serving as a conjugate point of the exit pupil 407 to the right. However, moving the image-forming element 401 requires the movement of the illumination unit together, so that this method is likely to increase the size of the display apparatus. In FIG. 4C, when the directions of principal rays are focused on, a principal ray CR' after the exit pupil 407 is moved proceeds toward the light-flux-deflecting unit 405 at a different angle from that of a principal ray CR before the movement.

Figure 4D:
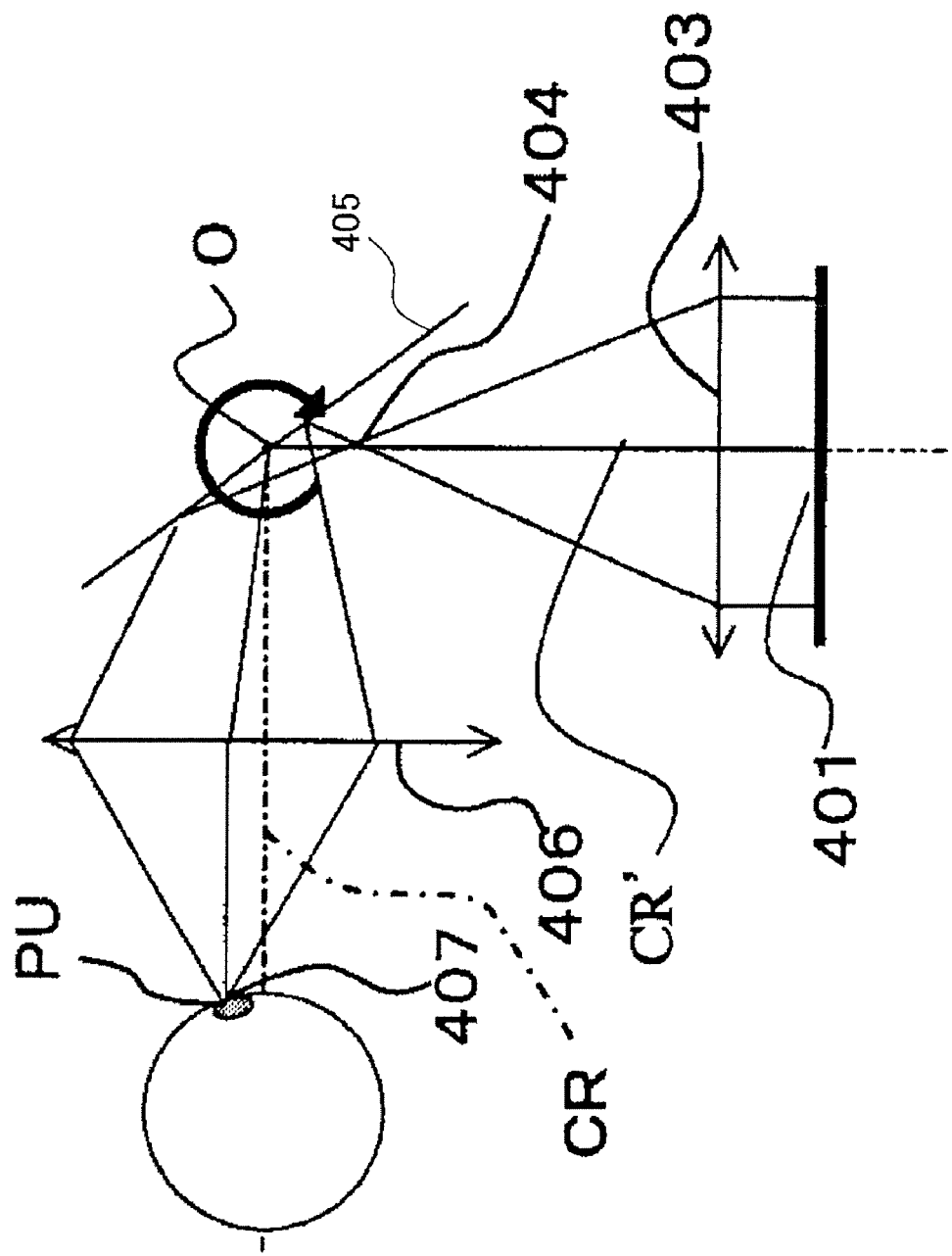
FIG. 4D schematically shows the principle of the movement of the exit pupil in Embodiment 1.

In contrast, in Embodiment 1, the light-flux-deflecting unit 405 is formed to be rotatable. The rotation of the light-flux-deflecting unit 405 about the point O changes the direction of the principal ray CR' proceeding toward the pupil PU from the light-flux-deflecting unit 405 as shown in FIG. 4D. On the other hand, the direction of the principal ray CR' proceeding toward the light-flux-deflecting unit 405 from the image-forming element 401 coincides with the direction of the principal ray CR before the exit pupil 407 is moved. Thus, the position of the exit pupil 407 can be moved while the image-forming element 401 and the condensing optical system 402 are maintained at the original positions.

In FIG. 3, the center O of the rotation of the light-flux-deflecting unit 104 is placed at the rear focal point when viewed from the side closer to the observer of the ocular unit 106, that is, at the focal point on the side closer to the image-forming element. In other words, the rotation center O is set at the focal point of the ocular unit 106 on the side closer to the image-forming element on the optical path of the central ray (principal rays CR and CR' shown in FIGS. 4A and 4D) from the center of the light exit area (image-forming area) of the image-forming element 101 to the center of the exit pupil 107, that is, the observation image. The rotation center O is set on the reflective surface 104a of the light-flux-deflecting unit 104.

The "focal point" includes not only the exact focal point but also a certain range which can be regarded as the focal point optically in the image display apparatus. "On the reflective surface 104a" includes not only the coincidence with the reflective surface 104a but also a certain range which can be regarded as the optical coincidence with the reflective surface 104a. A "certain range which can be regarded" includes a range within 10% of the focal length of the ocular unit 106, for example.

With the above-mentioned arrangement settings, the light-flux-deflecting unit 104 can be rotated about the point O to easily move the position of the exit pupil 107. Especially, the rotation center O can be set on the central ray (or the optical path of the central ray) passing through the center of the observation image, so that the position of the exit pupil 107 can be moved only by rotating the light-flux-deflecting unit 104. Since the direction of the light flux is changed at the focal point of the ocular unit 106, variations of aberrations other than distortion can almost be ignored.

The optical power of the reflective surface 104a of the light-flux-deflecting unit 104 can move only the direction of the light flux entering the ocular unit 106. This can provide the effect of optical distortion correction. In other words, the distortion in the image resulting from the rotation of the light-flux-deflecting unit 104 can be reduced.

In addition, the optical power of the reflective surface 104a allows correction of various types of aberration in combination with the ocular unit 406. This can lead to a simplified configuration of the ocular unit 106.

The positive power of the reflective surface 104a directs the light flux toward the ocular unit 106 without divergence after the incidence upon the light-flux-deflecting unit 104. This can achieve a reduction in the size of the ocular unit 106.

The rotation of the light-flux-deflecting unit 104 having the reflective surface 104a enables an increased movement amount of the exit pupil 107 even with the same amount of the rotation as compared with the case where a refractive optical element such as a lens is rotated. Consequently, a large movement amount of the exit pupil 107 can be ensured while the apparatus is small in size. It is also possible to reduce variations of chromatic aberration which are significantly found when the refractive optical element is rotated.

Figure 5:
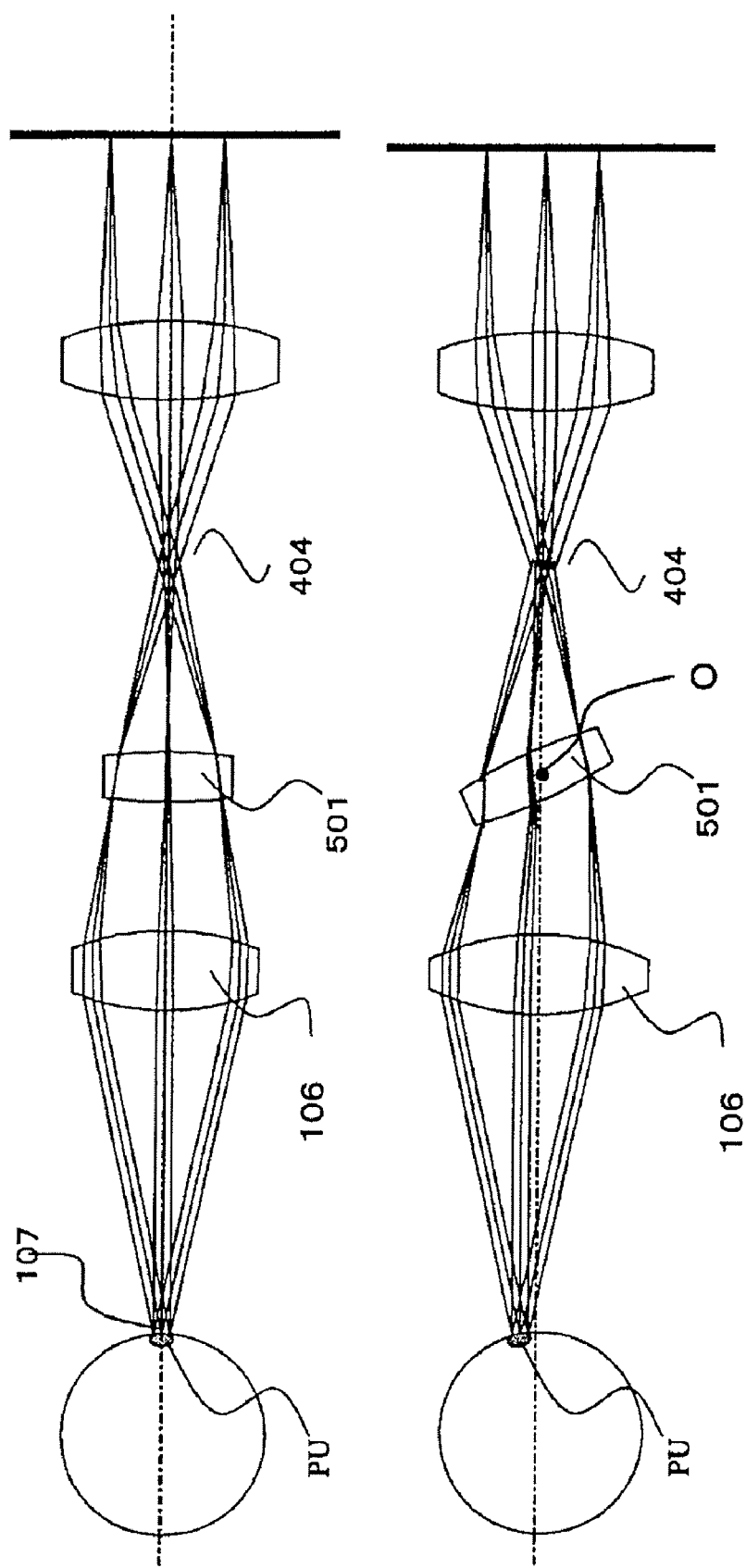
FIG. 5 is a diagram for explaining the movement of the exit pupil when a transmissive optical element is used.

If only a small movement amount of the exit pupil is required, a refractive optical element 501 having an optical power (refractive power) may be rotated to move the position of the exit pupil 107 as shown in FIG. 5. When the movement amount is small, significant variations of chromatic aberration are not produced even when light is transmitted through the refractive optical element 501. A rotation center O of the refractive optical element 501 is the intersection of the front principal plane (principal plane on the side closer to the exit pupil in FIG. 5) and the central ray. As in the case where the reflective surface 104a is used in FIG. 1, the refractive optical element 501 is preferably formed of an optical element having a positive power. In FIG. 5, reference numeral 404 shows a pupil serving as a conjugate point of the exit pupil 107.

While Embodiment 1 has been described in conjunction with only the rotation of the light-flux-deflecting unit 104, rotation and translation may be performed to cause the light flux to proceed in different directions. In this case, the rotation center of the light-flux-deflecting unit 104 is preferably set to the same position as the above-mentioned position.

Embodiment 1 has been described in conjunction with the movement of the position of the exit pupil 107 by the one light-flux-deflecting unit 104. It is possible to use a plurality of light-flux-deflecting units to move the position of the exit pupil.

Embodiment 2

Figure 6:
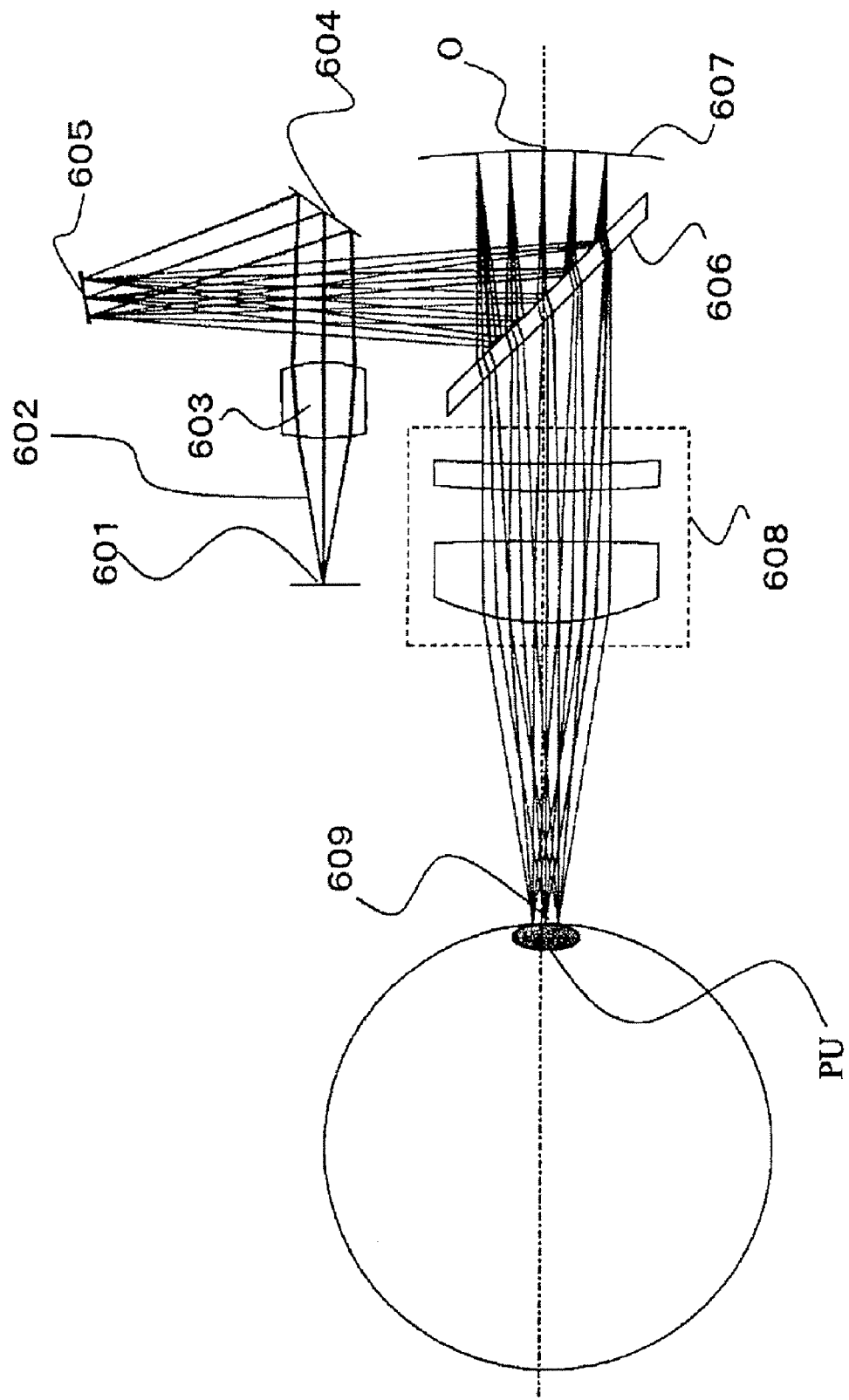
FIG. 6 is a vertical section view showing the configuration of optical systems of an image display apparatus which is Embodiment 2 of the present invention.

FIG. 6 shows the configuration of an image display apparatus which is Embodiment 2 of the present invention. While the element such as a liquid crystal panel having the image-forming plane for forming the two-dimensional image is used as the image-forming element in Embodiment 1, an element for two-dimensionally scanning light is used as the image-forming element in Embodiment 2.

A light flux 602 emerges from a light source 601, is changed into a parallel light beam by a collimator lens 603, reflected by a reflective surface 604, and enters a scanning unit (scanning image-forming element) 605. The scanning unit 605 reflects and two-dimensionally scans the entering light flux 602. The scanned light flux 602 is reflected by a half mirror 606 and then enters a light-flux-deflecting unit 607.

The light flux 602 is reflected by a reflective surface of the light-flux-deflecting unit 607, is transmitted through the half mirror 606, emerges from an ocular unit 608, and then forms an exit pupil 609. An observer places his/her pupil PU at the position of the exit pupil 609. Thus, a two-dimensional image is projected on the retina of the observer by the scanned light emerging from the ocular unit 608 to allow the observer to view the two-dimensional image through the residual image (afterimage) phenomenon of the eye.

The scanning unit 605 in Embodiment 2 needs to scan the light at a high frequency of several kHz to several tens of kHz. As the scanning unit 605, a MEMS (Micro Electro-Mechanical System) mirror device provided by using the micromachine technology is used, for example.

An example of the MEMS mirror device will hereinafter be described with reference to FIG. 7. The MEMS mirror device 701 is formed such that a micromirror 702 having a deflecting surface (reflective surface) is supported by torsion bars 703 and 704. The micromirror 702 performs resonant reciprocation about an axis 705 with the torsion bar 703 being twisted and reciprocation about an axis 706 with the torsion bar 704 being twisted. The reciprocation changes the normal direction of the micromirror 702 two-dimensionally. The micromirror 702 reflects the entering light flux to scan it two-dimensionally.

Such a MEMS mirror device can be used to reduce the size of the scanning unit 605.

Figure 7:
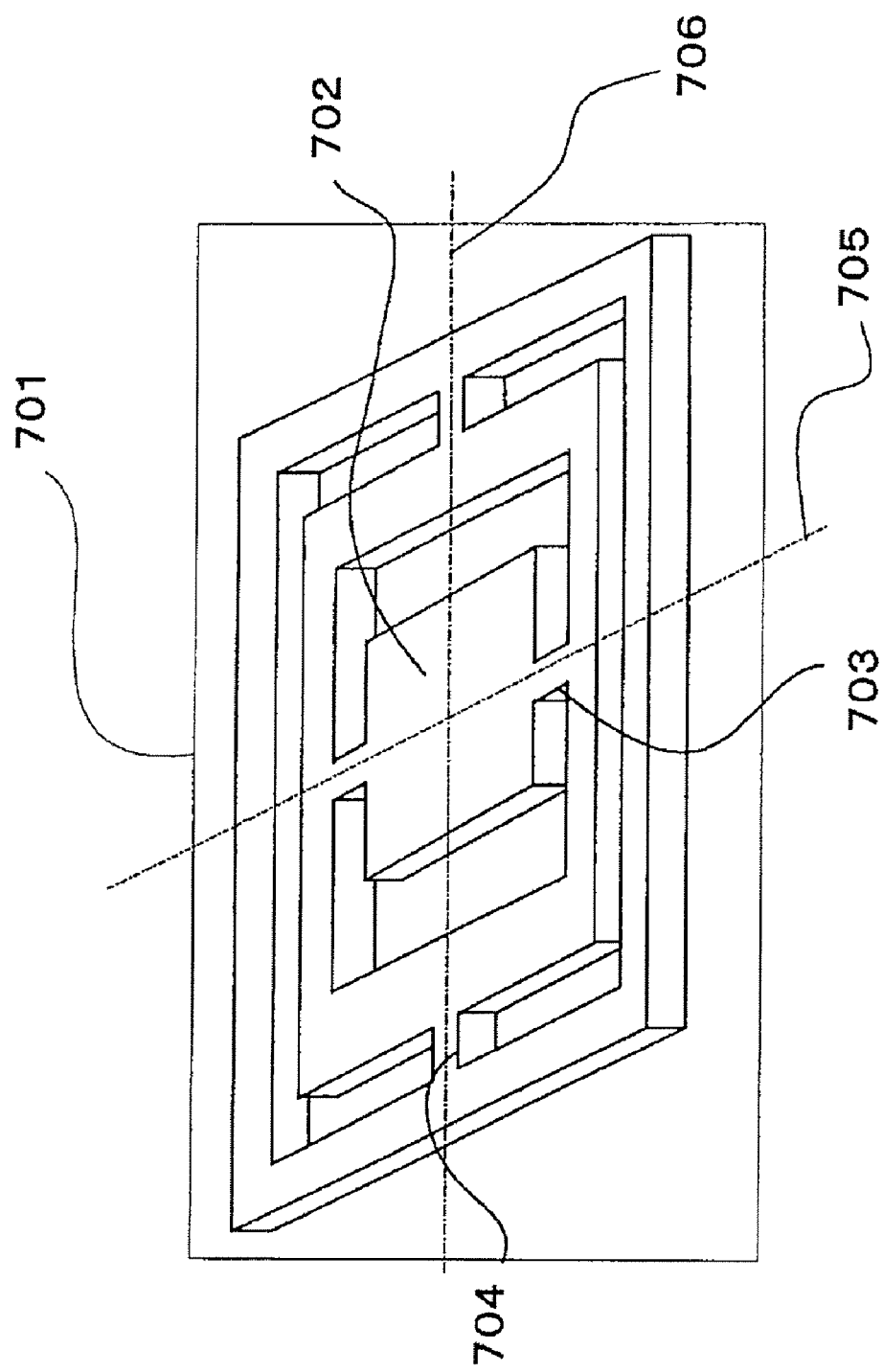
FIG. 7 is a perspective view showing an example of a MEMS mirror device used in Embodiment 2.

Other than the MEMS mirror device in which the one element can scan the light two-dimensionally as shown in FIG. 7, the scanning unit 605 may be formed of two sets of one-dimensional scanning with a rotatable polygon mirror or two MEMS mirror devices each capable of one-dimensional scanning.

Figure 8A:
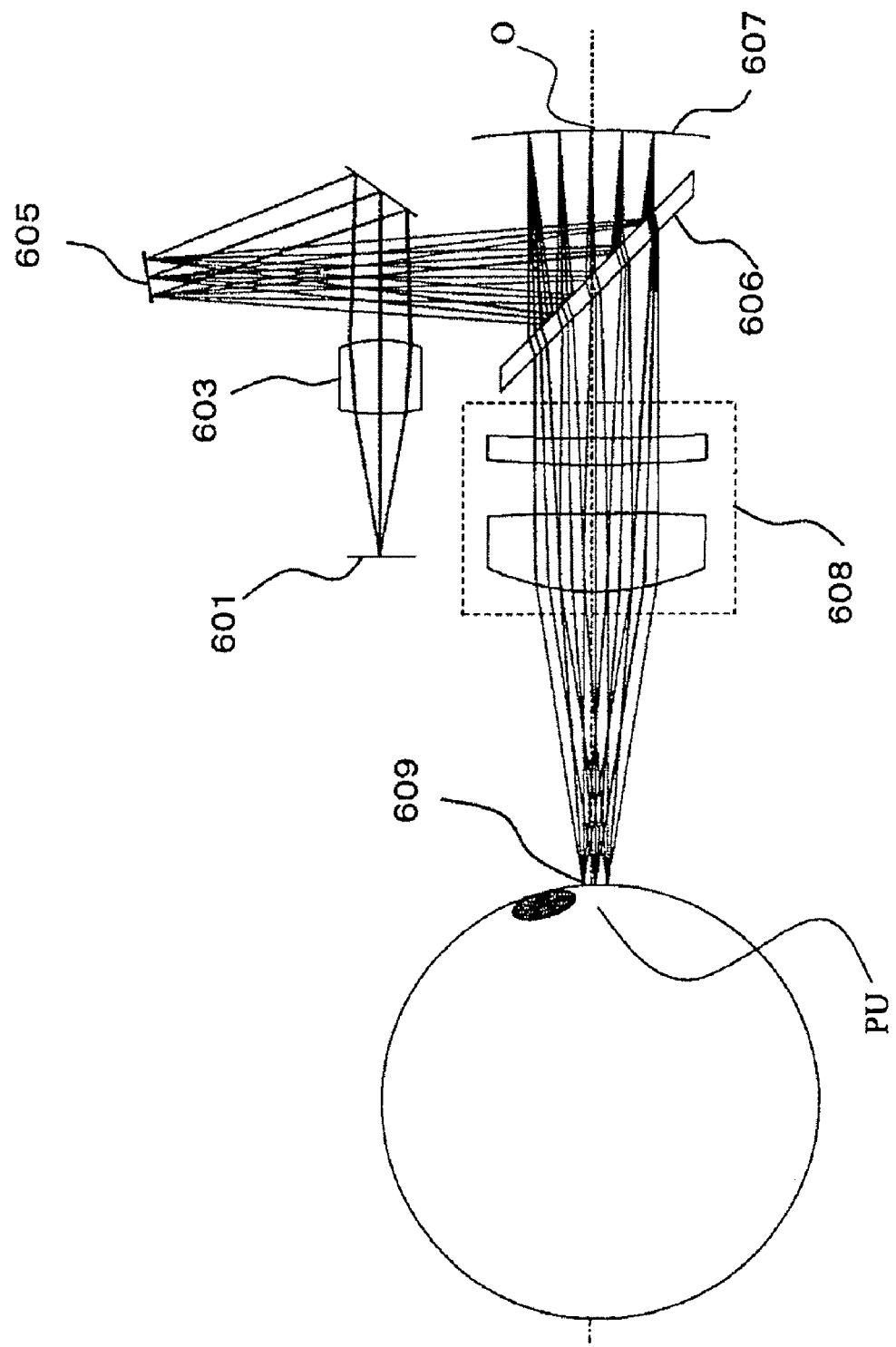
FIG. 8A is a schematic diagram for explaining a situation in which an eyeball movement prevents observation of an image in Embodiment 2.

When the MEMS mirror device as shown in FIG. 7 is used as the scanning unit 605, the micromirror 702 has a small size and thus the diameter of the exit pupil 609 is reduced. The actual diameter of the exit pupil 609 typically ranges from approximately 0.5 to 1.5 mm. For a wide display angle of view, the pupil of an observer moves by several millimeters due to his/her eyeball movement. Since the diameter of the pupil of the observer ranges from approximately 2 to 7 mm, the light flux is out of the pupil when the end portion of the angle of view is observed as shown in FIG. 8A, which prevents the image from being observed.

Figure 8B:
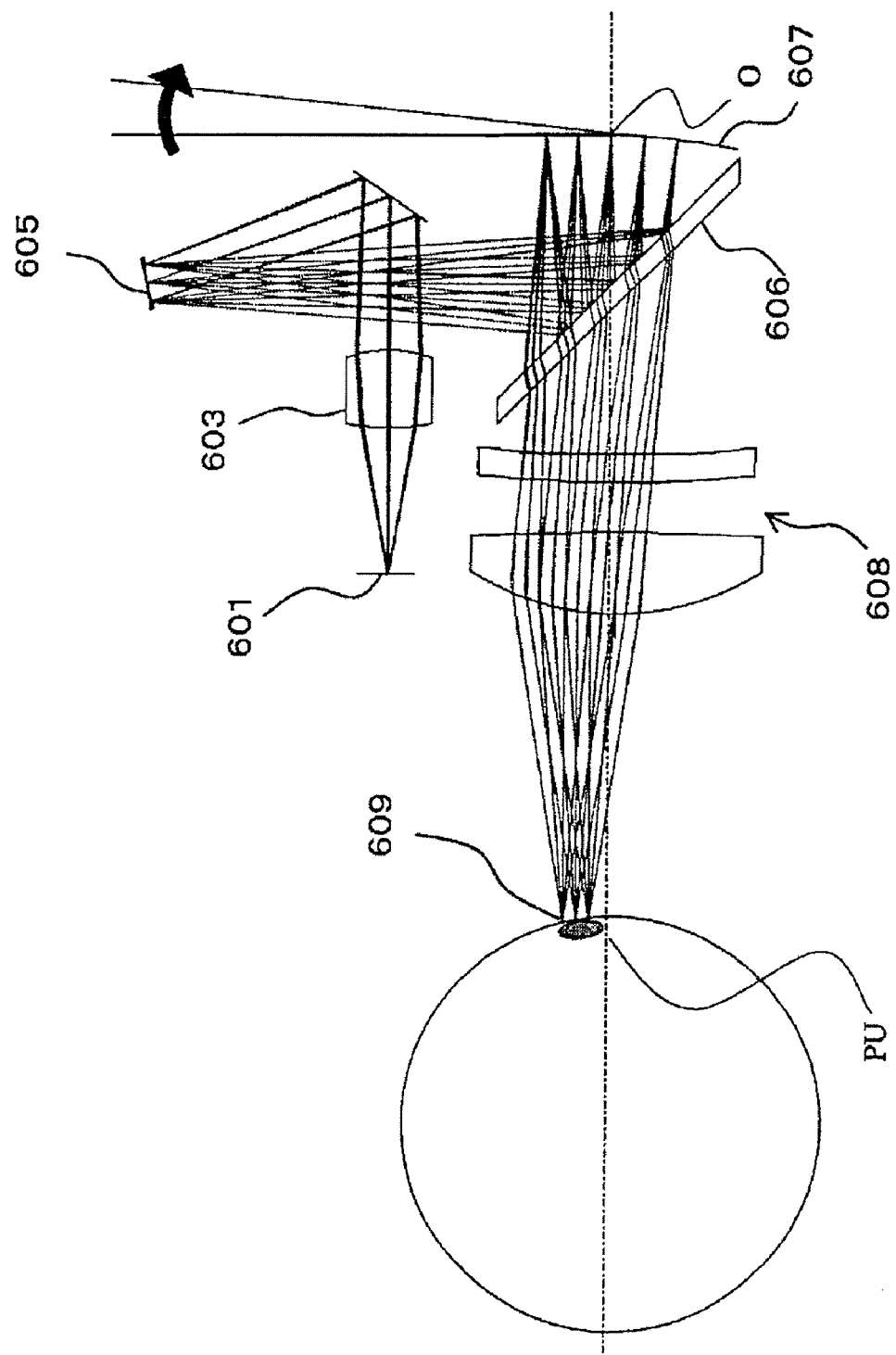
FIG. 8B is a diagram for explaining the movement of an exit pupil in Embodiment 2.

To prevent this, in Embodiment 2, the light-flux-deflecting-unit 607 is rotated about the point O. As a result, the light flux entering the light-flux-deflecting unit 607 proceeds in a different direction after the reflection, and thereby the position of the exit pupil 609 is moved as shown in FIG. 8B.

The rotation center O of the light-flux-deflecting unit 607 in Embodiment 2 is basically set in a similar manner to Embodiment 1. Specifically, the rotation center O is placed at the rear focal point when viewed from the observer of the ocular unit 608, that is, at the focal point on the side closer to the image-forming element. In other words, the rotation center O is set at the focal point of the ocular unit 608 on the side of the image-forming element on the optical path of the central ray from the center of the light reflecting area (area of the micromirror that reflects light) of the scanning unit 605 to the center of the exit pupil 609. The rotation center O is set on the reflective surface of the light-flux-deflecting unit 607.

While the light-flux-deflecting unit 607 is rotated in FIG. 8 in a plane in parallel with the sheet of FIG. 8 to move the exit pupil 609 in that plane, the light-flux-deflecting unit 607 may be rotated in a plane perpendicular to the sheet of FIG. 8 to move the exit pupil 609 in that plane.

Embodiment 3

Figure 9:
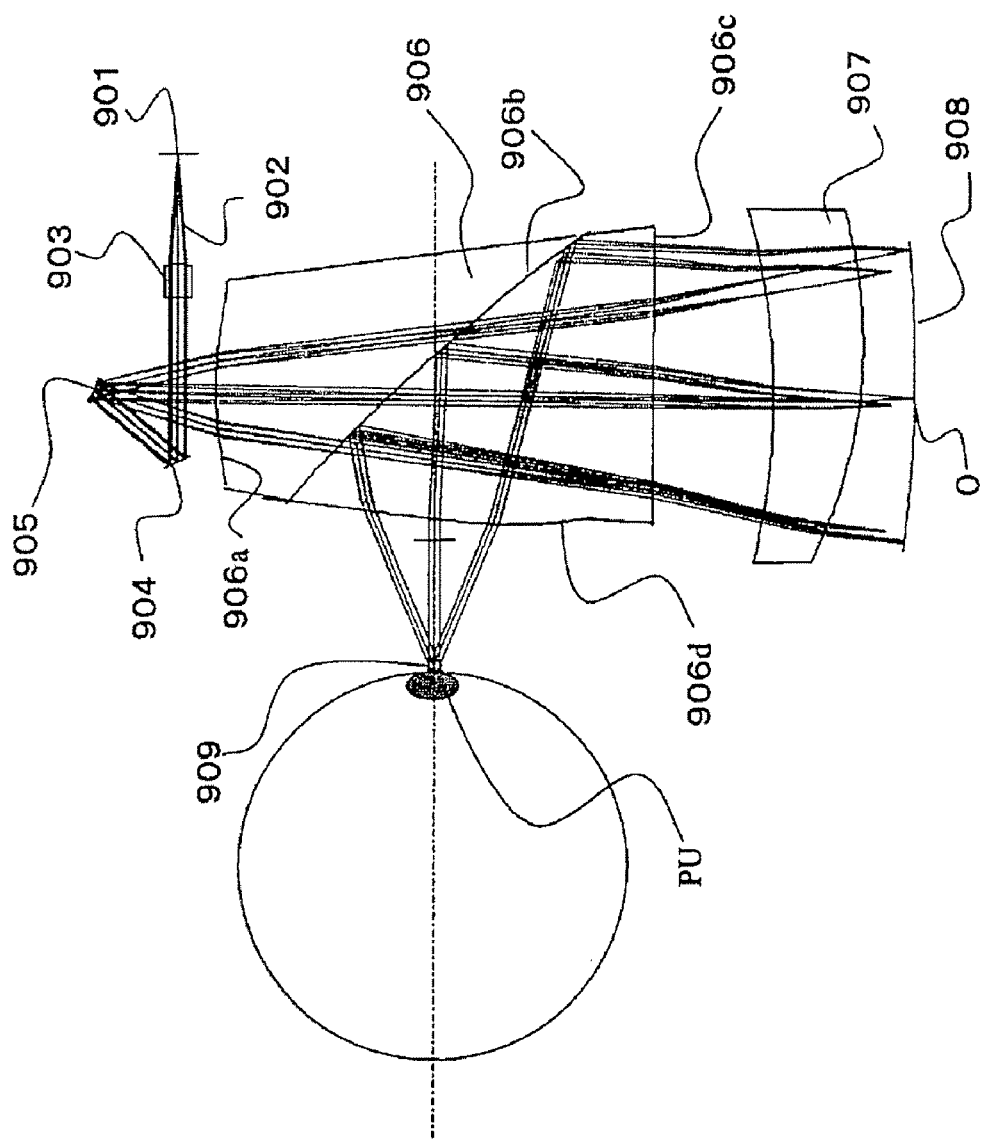
FIG. 9 is a vertical section view showing the configuration of optical systems of an image display apparatus which is Embodiment 3 of the present invention.

FIG. 9 shows the configuration of an image display apparatus which is Embodiment 3 of the present invention. While a scanning unit formed of the MEMS mirror device is used in Embodiment 3 similarly to Embodiment 2, Embodiment 3 differs from Embodiment 2 in that the ocular unit is realized by using a prism which serves as a light-guiding element having a rotationally asymmetric surface.

A light flux 902 emerges from a light source 901, is changed into a parallel light beam by a collimator lens 903, and enters a scanning unit 905 via a reflective mirror 904. The light flux 902 is scanned two-dimensionally by the scanning unit 905 and enters a prism 906 through an entrance surface 906a of the prism 906.

The light flux entering the prism 906 is then transmitted through a half mirror surface 906b formed in the prism 906 and emerges from the prism 906 through an entrance/exit surface 906c. The light flux 902 emerging from the entrance/exit surface 906c is then transmitted through a transmissive element 907 and enters a light-flux-deflecting unit 908.

The light flux is reflected by a reflective surface of the light-flux-deflecting unit 908, again transmitted through the transmissive element 907, and re-enters the prism 906 from the entrance/exit surface 906c. The light flux 902 re-entering the prism 906 is then reflected by the half mirror 906b, passes through an exit surface 906d and emerges from the prism 906, and forms an exit pupil 909.

Figure 10:
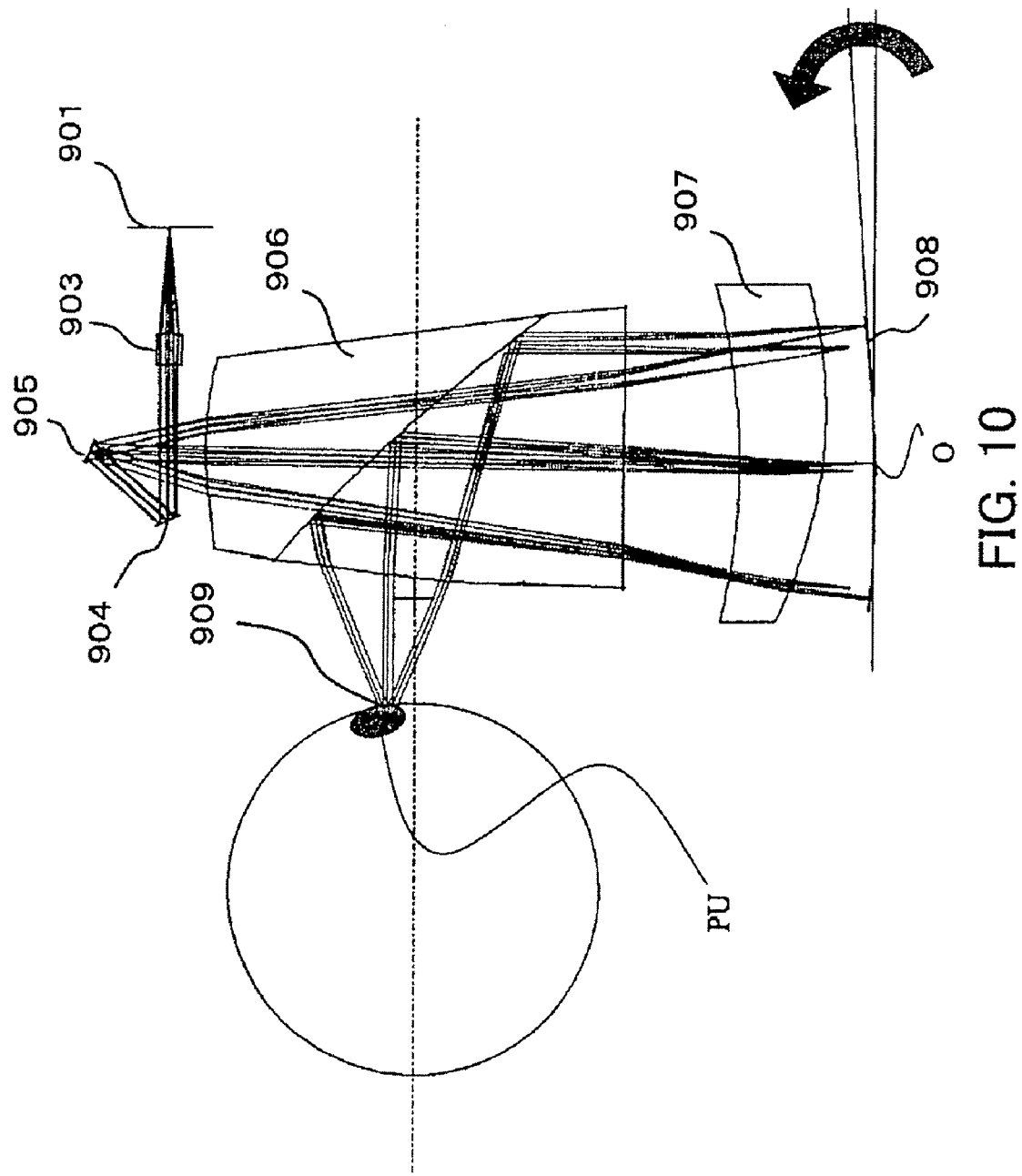
FIG. 10 is a diagram for explaining the movement of an exit pupil in Embodiment 3.

In Embodiment 3, the light-flux-deflecting unit 908 can be rotated about a point O to move the position of the exit pupil 909. As shown in FIG. 10, to move the exit pupil 909 upward and downward, the light-flux-deflecting unit 908 is rotated in a plane in parallel with the sheet of FIG. 9. To move the exit pupil 909 in a plane perpendicular to the sheet of FIG. 9, the light-flux-deflecting unit 908 is rotated in a plane in that plane.

Embodiment 4

Figure 11A:
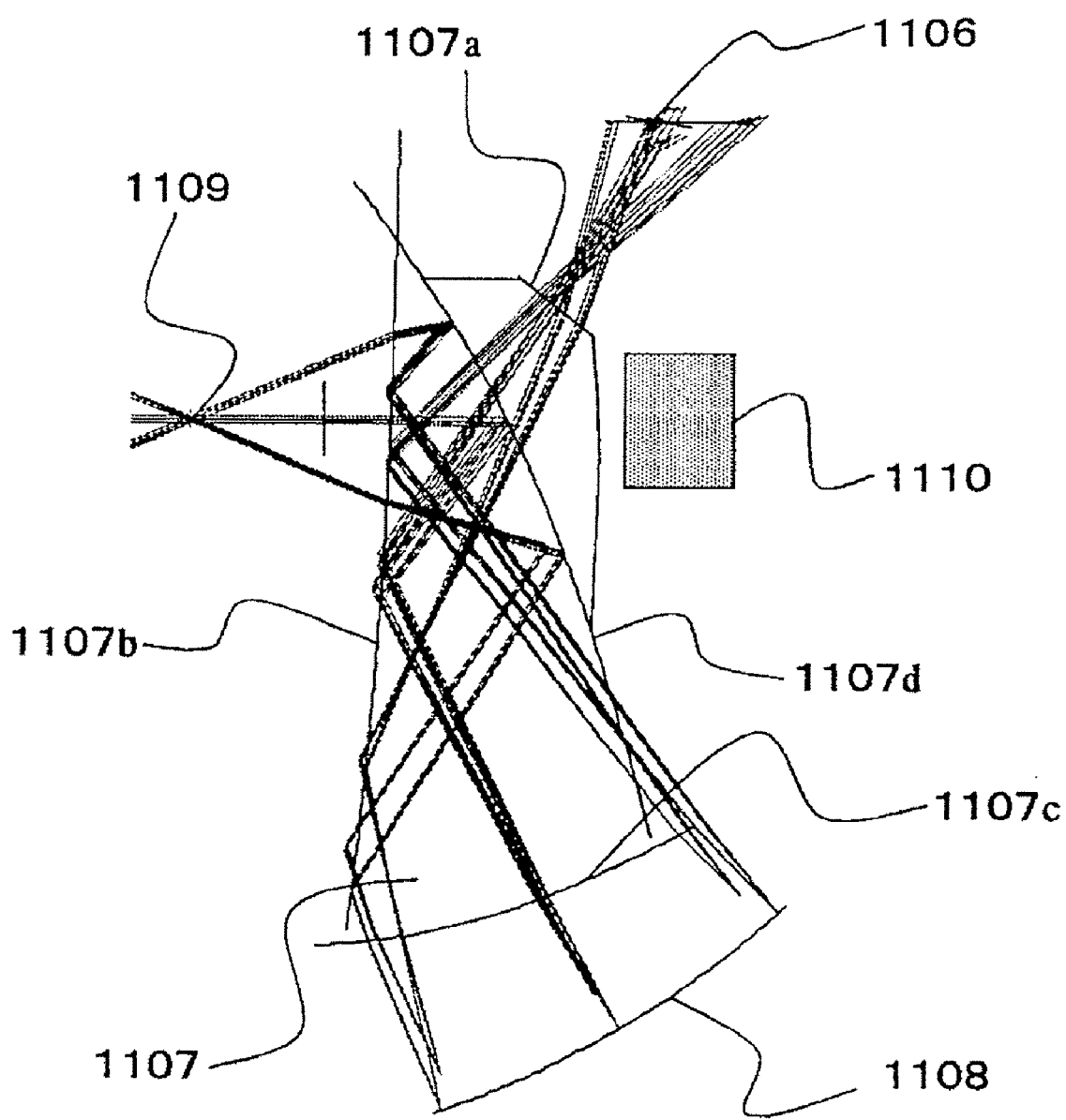
FIG. 11A is a vertical section view showing the configuration of optical systems of an image display apparatus which is Embodiment 4 of the present invention.
Figure 11B:
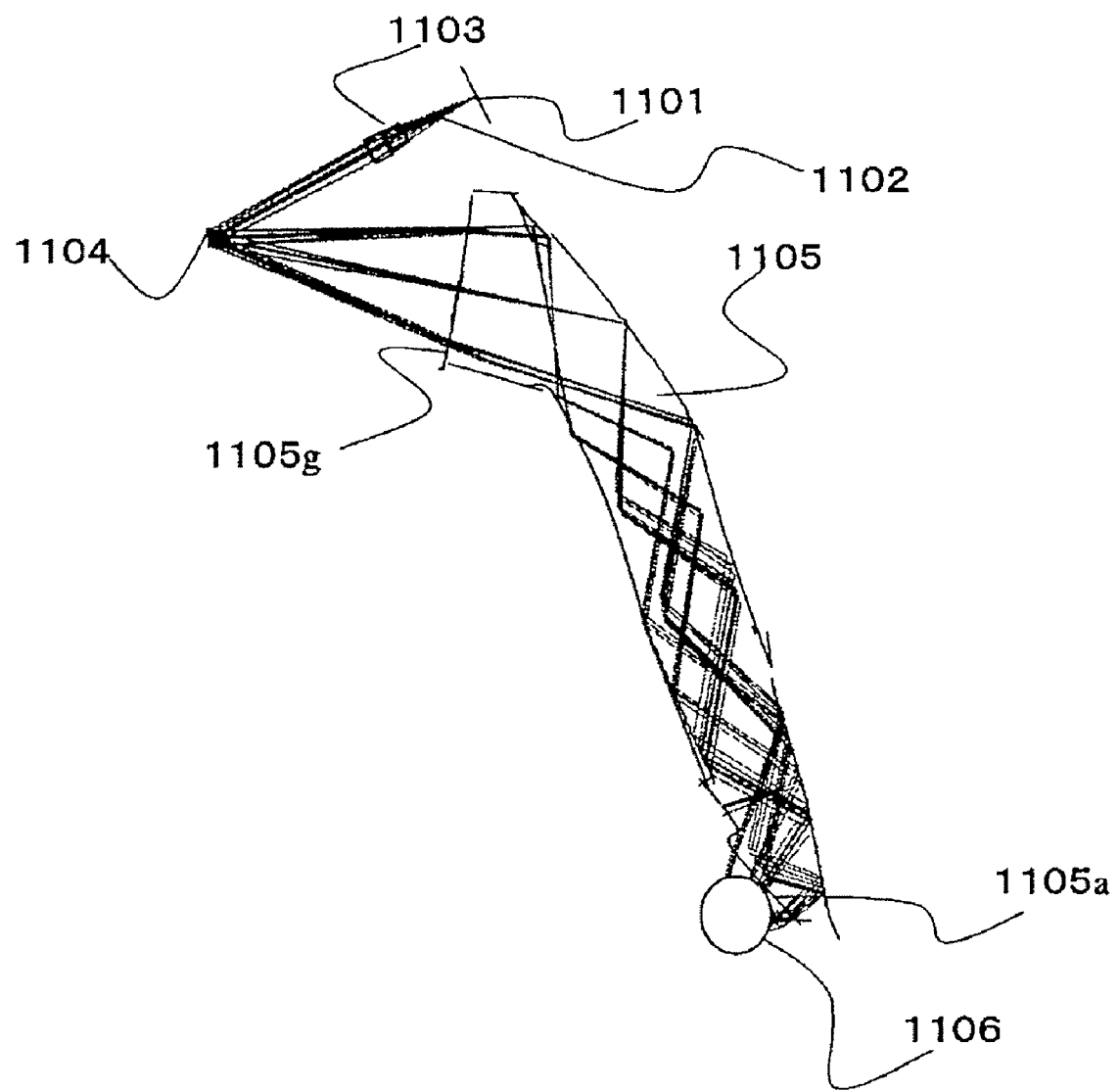
FIG. 11B is a diagram showing the configuration of the optical system of Embodiment 4 viewed from above.

FIGS. 11A and 11B show the configuration of an image display apparatus which is Embodiment 4 of the present invention. In Embodiment 4, similarly to Embodiment 3, a scanning unit is used as the image-forming element, and a prism is used as the ocular unit. However, Embodiment 4 has a three-dimensional optical layout in which an optical system is bent in a direction perpendicular to the sheet of FIG. 11A. Thus, in addition to a vertical section view of FIG. 11A, FIG. 11B is provided as a perspective view when the optical system is viewed from above.

Embodiment 4 also includes a mechanism for detecting the position of a pupil PU of an observer and controlling the rotation of a light-flux-deflecting unit to cause the position of an exit pupil to follow the detected position of the pupil. The control mechanism is also applicable to the other embodiments described above.

In FIGS. 11A and 11B, a light flux 1102 emerges from a light source 1101, is changed into a parallel light beam by a collimator lens 1103, and enters a scanning unit 1104 via a reflective surface 1104.

The light flux 1102 is scanned by the scanning unit 1104 and enters a relay optical system 1105 formed of a first prism having a plurality of internal reflective surfaces through an entrance surface 1105g. The light flux entering the relay optical system 1105 then emerges from an exit surface 1105a and impinges on a twisting reflective surface 1106. The light flux 1102 impinging on the twisting reflective surface 1106 is then bent in a direction perpendicular to the sheet of FIG. 11B (direction in parallel with the sheet of FIG. 11A). The bent light flux 1102 enters a second prism 1107 forming an ocular unit through an entrance surface 1107a.

The light flux 1102 entering the second prism 1107 is then totally reflected by an internal reflective surface 1107b, emerges from an entrance/exit surface 1107c, and enters a light-flux-deflecting unit 1108. The light flux 1102 is reflected by a reflective surface of the light-flux-deflecting unit 1108 and re-enters the prism 1107 from the entrance/exit surface 1107c. Then, the light flux 1102 is totally reflected by the internal reflective surface 1107b and an internal reflective surface 1107d, is transmitted through the surface 1107b and emerges from the second prism 1107, and forms an exit pupil 1109. An observer can see an image by placing his/her pupil at the position of the exit pupil 1109.

Figure 12A:
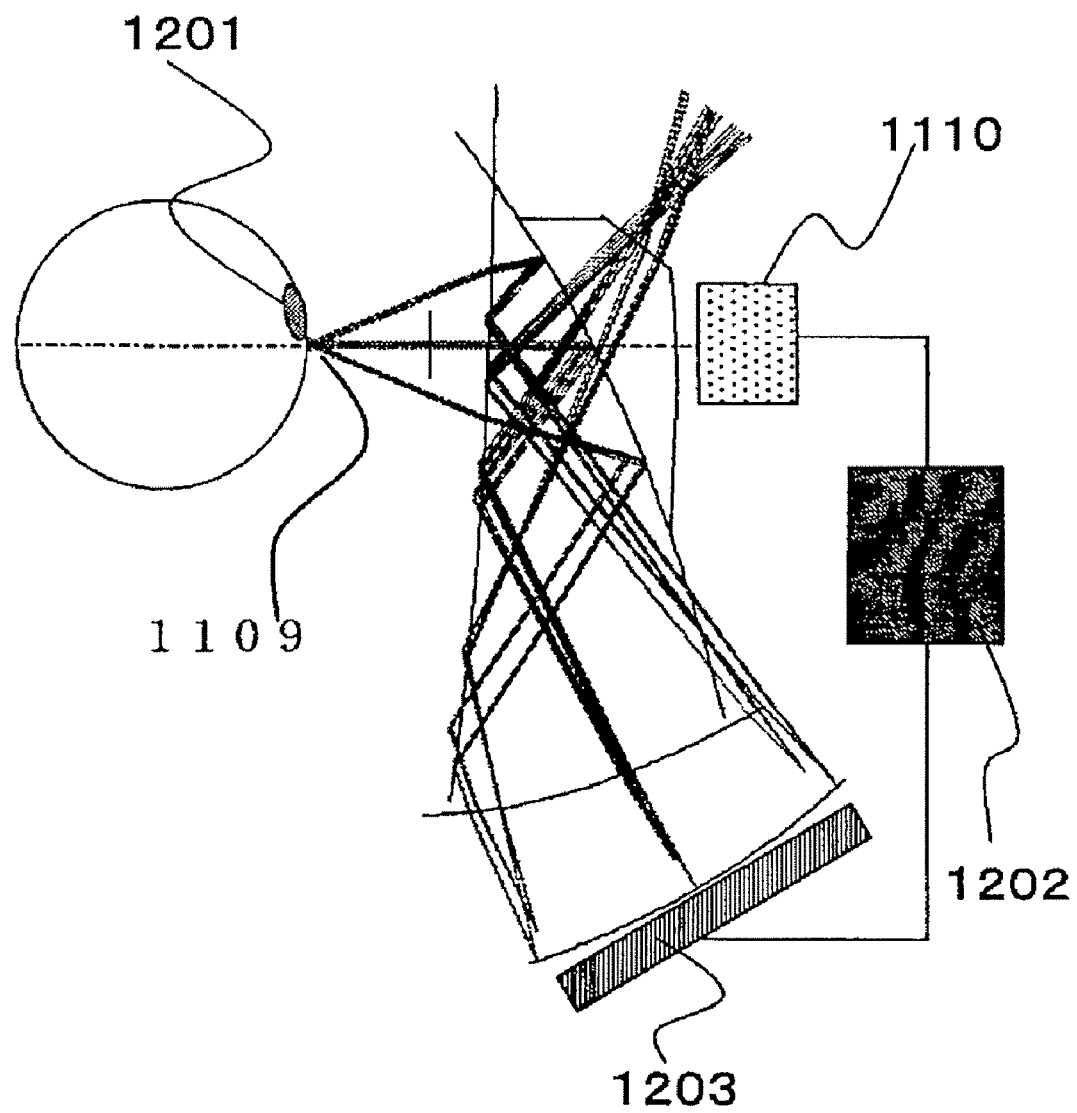
FIG. 12A is a diagram showing the configuration for performing detection of the position of a pupil and control to follow an exit pupil in Embodiment 4.

When a pupil 1201 of the observer moves relative to the exit pupil 1109 as shown in FIG. 12A, the observer cannot view the image in that state.

Figure 25:
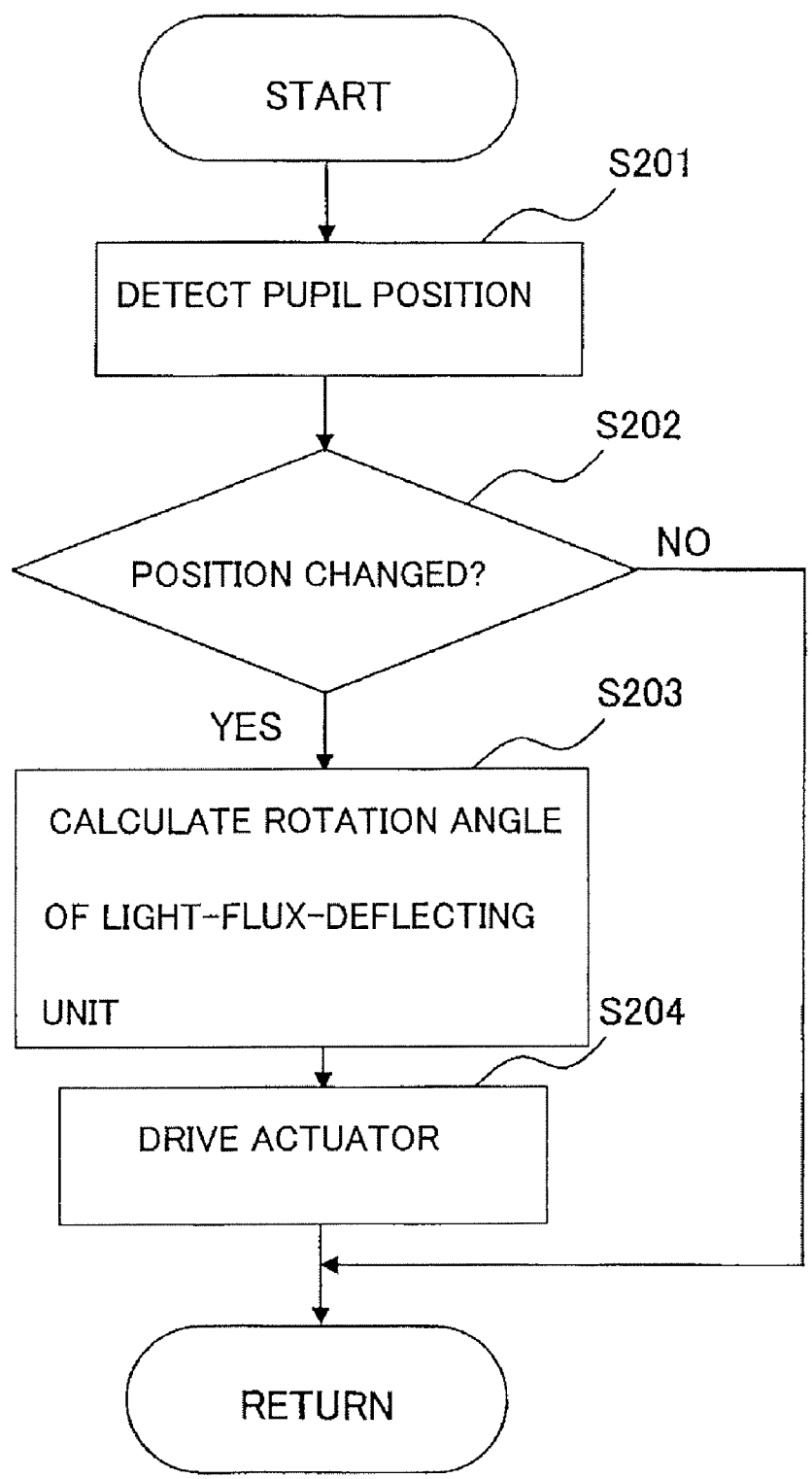
FIG. 25 is a flow chart showing the control for following the exit pupil in Embodiment 4.

To address this, in Embodiment 4, a control unit 1202 controls the rotation position of the light-flux-deflecting unit 1108 such that the position of the exit pupil 1109 follows the position of the pupil 1201 in accordance with a flow chart shown in FIG. 25.

At step (shown as S in FIG. 25) 201, the control unit 1202 detects the position of the pupil 1201 with a pupil-position-detecting unit 1110. A number of methods have been proposed for detecting the position of the pupil, and any of them may be employed in this embodiment. For example, it is possible that an image-pickup element such as a CCD sensor picks up a video image of eyeballs to determine a characteristic pixel area corresponding to the pupil in the video image through calculations to locate the pupil. The information on the current position of the pupil 1201 detected by the pupil-position-detecting unit 1110 in this manner is sent to the control unit 1202.

At step 202, the control unit 1202 determines whether or not the pupil position detected by the pupil-position-detecting unit 1110 has been changed from the pupil position detected in the previous sampling. If the pupil position has not been changed, the flow returns. If the pupil position has been changed, the flow proceeds to step 203 where the control unit 1202 calculates the necessary moving amount of the exit pupil 1109 based on the information about the pupil position detected by the pupil-position-detecting unit 1110 and calculates the rotation angle of the light-flux-deflecting unit 1108 for achieving the necessary moving amount.

Figure 12B:
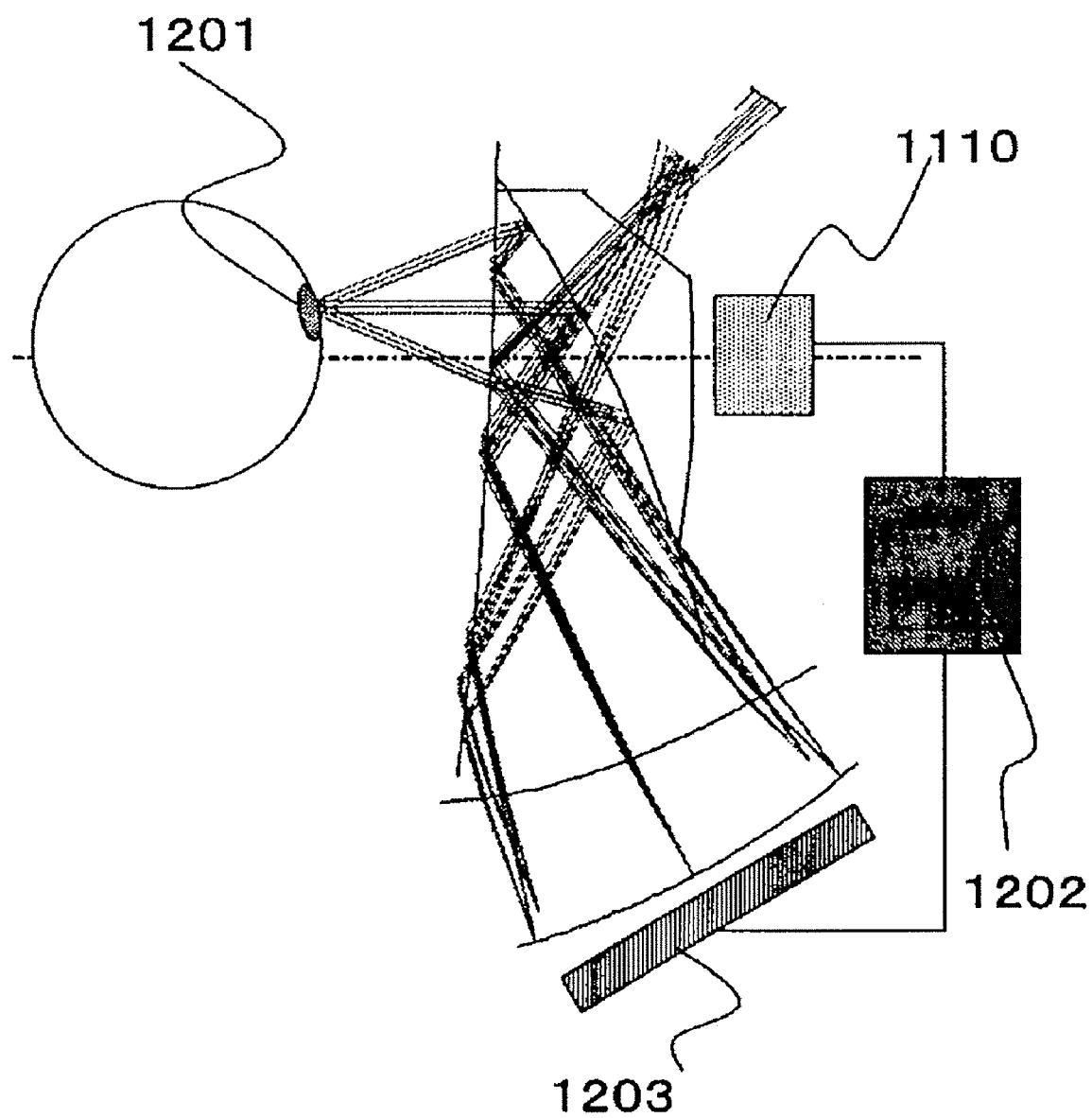
FIG. 12B is a diagram showing the configuration for performing detection of the position of the pupil and control to follow the exit pupil in Embodiment 4.

The control unit 1202 operates an actuator 1203 which drives the light-flux-deflecting unit 1108 to rotate in accordance with the calculated rotation angle at step 204. Thus, as shown in FIG. 12B, the position of the exit pupil 1109 is matched with the position of the pupil 1201.

The control for causing the exit pupil to follow the pupil of the observer as described above is performed at all times during display of images in the image display apparatus, thereby allowing the position of the exit pupil 1109 to coincide with the position of the pupil 1201 at all times. Even when the position of the pupil 1201 moves due to an eyeball movement of the observer or the like, the observer can always view images.

An approach similar to the follow control described in Embodiment 4 can be used to perform automatic adjustment of the interval between a pair of image display apparatuses placed for both eyes of an observer, that is, so-called interpupillary automatic adjustment.

Numerical examples for Embodiments 1 to 4 will hereinafter be described. While each of Embodiments 1 to 4 has been described along the optical path from the light source side to the exit pupil side, Numerical Examples will be described by tracing a light ray in reverse order from the exit pupil side.

Tables 1 to 4 provide Numerical Examples corresponding to Embodiments 1 to 4, respectively. In each of Numerical Examples, the position of the light source is shown as the reference of the absolute coordinate system. Specifically, three-dimensional coordinate axes in the absolute coordinate system are defined as a Z axis, a Y axis, and an X axis.

Z-axis: a straight line which passes through the center of a first surface (the origin of the absolute coordinate system) from the center of a zeroth surface and extends in a direction defined as positive.

Y-axis: a straight line which passes through the center of the first surface (the origin of the absolute coordinate system) and forms an angle of 90 degrees counterclockwise with respect to the Z-axis.

X-axis: a straight line which passes through the origin and is perpendicular to the Z-axis and the Y-axis.

The shape of an i-th surface forming part of an optical system is written by setting a local coordinate system and using a function based on the local coordinate system. The tilt angle of an i-th surface in the YZ-plane is represented by an angle $\theta gi$ (in degrees) with respect to the Z-axis of the absolute coordinate system with the counterclockwise direction defined as positive. In Examples, the tilt angle is set only in the YZ-plane. A y-axis and a z-axis of the local coordinate system (x, y, z) of an i-th surface are placed in the YZ-plane of the absolute coordinate system and inclined by the angle $\theta gi$ in the YZ-plane.

z-axis: a straight line which passes through the origin of the local coordinate system and forms an angle $\theta i$ counterclockwise with respect to the Z-axis of the absolute coordinate system in the YZ-plane.

y-axis: a straight line which passes through the origin of the local coordinate system and forms an angle of 90 degrees counterclockwise with respect to the z-direction in the YZ-plane.

x-axis: a straight line which passes through the origin of the local coordinate system and is orthogonal to the YZ-plane.

In each of Tables, Ndi and vdi represent the refractive index and Abbe number of the d line between an i-th surface and an (i+1)-th surface.

In each of Numerical Examples, the shape of a rotationally asymmetric surface having no axis of rotational symmetry is represented with the following expression. In Numerical Examples, the rotationally asymmetric surface is shown as 'SPS XYP'.

$$z = \frac{cr^2}{1+\sqrt{1-(1+k)c^2r^2}} + c2x + c3y + c4x^2 + c5xy + c6y^2 + c7x^3 +$$
$$c8x^2y + c9xy^2 + c10y^3 + c11x^4 + c12x^3y + c13x^2y^2 + c14xy^3 +$$

-continued $$c15y^4 + c16x^5 + c17x^4y + c18x^3y^2 + c19x^2y^3 + c20xy^4 + c21y^5 +$$
$$c22x^6 + c23x^5y + c24x^4y^2 + c25x^3y^3 + c26x^2y^4 + c27xy^5 +$$
$$c28y^6 + c29x^7 + c30x^6y + c31x^5y^2 + c32x^4y^3 + c33x^3y^4 +$$
$$c34x^2y^5 + c35xy^6 + c36y^7 + c37x^8 + c38x^7y + c39x^6y^2 +$$
$$c40x^5y^3 + c41x^4y^4 + c42x^3y^5 + c43x^2y^6 + c44xy^7 + c45y^8$$

This function defines the shape of a surface with the local coordinate system (x, y, z) of the i-th surface. In the function, the terms including x of odd order can be set to zero in the local coordinate system to provide a surface symmetric with respect to the yz-plane.

In each example, the surface apex of each surface is shifted in the y- and z-axis directions, and is only tilted around the x axis. Thus, a conventional generatrix section and a local generatrix section are the same, while a conventional directrix section is different from a local directrix section.

In each of Numerical Examples, 'rx' and 'ry' represent the radius of curvature of each optical surface at the origin of the local coordinate system (the radius of curvature on the local generatrix section and the radius of curvature on the local directrix section), 'd' represents the interval between local surfaces and indicates the distance between hit points of a light ray on the i-th surface and the (i+1)-th surface (the distance on the optical path of the central ray and the value without air conversion), and 'shift' and 'tilt' represent the shift amount in the y- and z-axis directions and the tilt amount around the x-axis, respectively.

A surface having the shape of a free-form surface is shown as 'XYP', a surface having the shape of a spherical surface is shown as 'SPH', a surface having the shape of an aspheric surface is shown as 'ASP', and the coefficients are shown in lower fields of Tables. 'M' means a reflective surface.

In each of Tables, e±X means ×10±X.

Numerical Example 1

The image-forming element is realized by a liquid crystal panel measuring 0.4 inches diagonally. The diagonal angle of view is 30 degrees, the aspect ratio is 4:3 (24 degrees horizontal, 18 degrees vertical), and the exit pupil diameter is 1 mm. The moving amount of the exit pupil is ±1.5 mm in a vertical direction in a plane in parallel with the sheet of FIG. 1 (hereinafter referred to simply as a vertical direction). In this case, the reflective surface (eighth surface) of the light-flux-deflecting unit (104 in FIG. 1) is rotated by ±2.5 degrees (double signs in same order) in the vertical direction about the intersection of the reflective surface and the optical path of the central ray.

Figure 13:
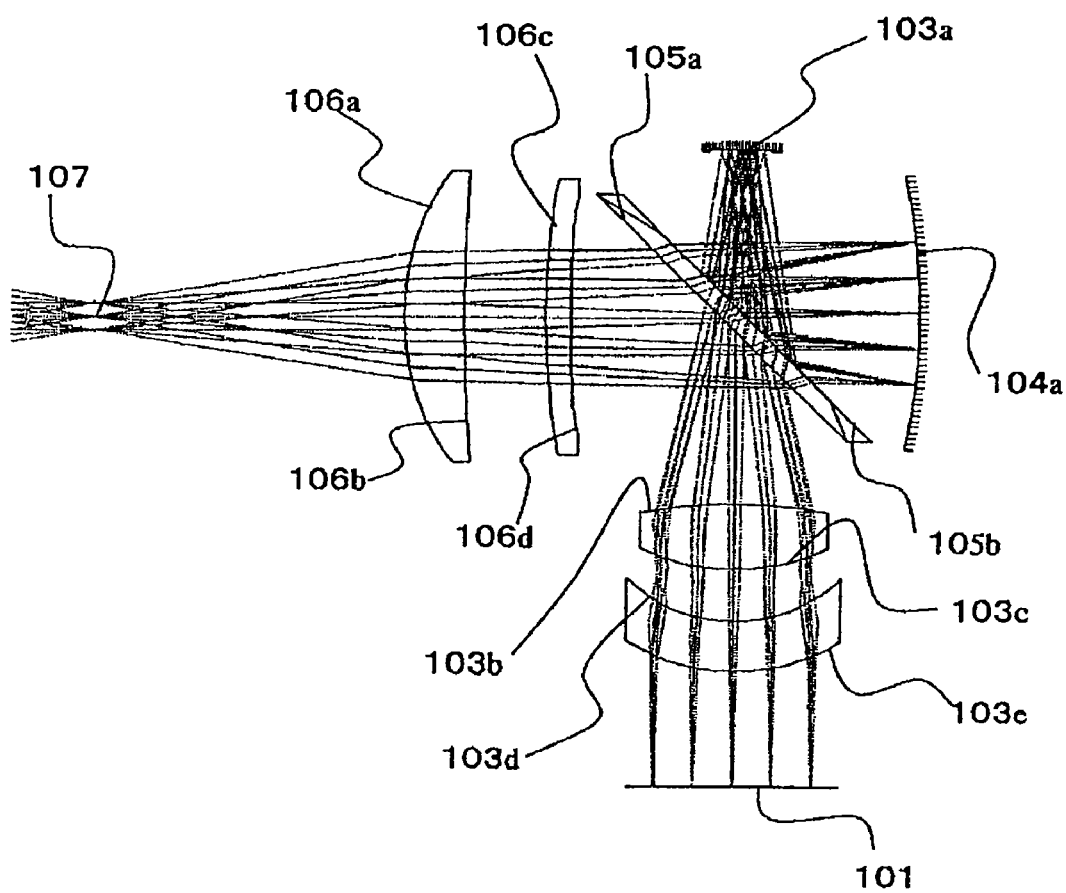
FIG. 13 is a diagram showing optical surfaces in Numerical Example 1 of the present invention.

The correspondence between the components and the surface numbers in Tables will be described with reference to FIG. 13 which shows the same optical system as that in FIG. 1.

exit pupil 107 surface number 1
surface 106a surface number 2
surface 106b surface number 3
surface 106c surface number 4
surface 106d surface number 5
surface 105a surface number 6, 12
surface 105b surface number 7, 9, 11
surface 104a surface number 8
surface 103a surface number 10
surface 103b surface number 13
surface 103c surface number 14
surface 103d surface number 15
surface 103e surface number 16
image-forming element (image-forming surface) 101 surface number 17

TABLE 1

| type | sur | Yg | Zg | θg | ry | rx | d | shift | tilt | nd | vd |
|---|---|---|---|---|---|---|---|---|---|---|---|
|  | 1 | 0.0000 | 0.0000 | 0.0000 | 0.0000 | 0.0000 | 12.000 | 0.000 | 0.000 | 1.000 |  |
| AL | 2 | 0.0000 | 12.0000 | 0.0000 | 10.6161 | 10.6161 | 2.283 | 0.000 | 0.000 | 1.533 | 40.39 |
|  | 3 | 0.0000 | 14.2833 | 0.0000 | 80.3090 | 80.3090 | 3.131 | 0.000 | 0.000 | 1.000 |  |
|  | 4 | 0.0000 | 17.4144 | 0.0000 | 28.2056 | 28.2056 | 1.001 | 0.000 | 0.000 | 1.533 | 40.39 |
| AL | 5 | 0.0000 | 18.41563 | 0.0000 | 416.9405 | 416.9405 | 5.775 | 0.000 | 0.000 | 1.000 |  |
|  | 6 | 0.0000 | 24.1904 | 45.0000 | 0.0000 | 0.0000 | 0.934 | 0.000 | 45.000 | 1.519 | 46.85 |
|  | 7 | 0.0000 | 25.1245 | 45.0000 | 0.0000 | 0.0000 | 6.597 | 0.000 | 45.000 | 1.000 |  |
| XYP-M | 8 | 0.2142 | 31.72154 | −0.0027 | 0.0000 | 0.0000 | −6.597 | 0.214 | −0.003 | −1.000 |  |
| M | 9 | 0.0000 | 25.12452 | 45.0000 | 0.0000 | 0.0000 | −0.212 | 0.000 | 45.000 | 1.000 |  |
| M | 10 | 6.5224 | 24.91270 | 90.0000 | −19.2385 | −19.2385 | 0.212 | 6.522 | 90.000 | −1.000 |  |
|  | 11 | 0.0000 | 25.1245 | 45.0000 | 0.0000 | 0.0000 | −0.934 | 0.000 | 45.000 | −1.519 | 46.85 |
|  | 12 | 0.0000 | 24.1904 | 45.0000 | 0.0000 | 0.0000 | 0.000 | 0.000 | 45.000 | −1.000 |  |
|  | 13 | −7.2588 | 24.6918 | 90.0000 | −18.3223 | −18.3223 | 0.000 | −7.259 | 90.000 | −1.533 | 40.39 |
|  | 14 | −9.8130 | 24.6918 | 90.0000 | 7.9617 | 7.9617 | 0.000 | −9.813 | 90.000 | −1.000 |  |
|  | 15 | −11.8071 | 24.6918 | 90.0000 | 5.8225 | 5.8225 | 0.000 | −11.807 | 90.000 | −1.533 | 40.39 |
|  | 16 | −13.7006 | 24.6918 | 90.0000 | 7.8580 | 7.8580 | 0.000 | −13.701 | 90.000 | −1.000 |  |
|  | 17 | −18.2606 | 24.6918 | 90.0000 | 0.0000 | 0.0000 | 0.000 | −18.261 | 90.000 | −1.000 |  | surface no. 2 ASP rdy = 1.062e+001    k = 4.281e−002    a = 1.178e−004    b = 5.647e−007 surface no. 3 SPH rdy = 8.031e+001 surface no. 4 SPH rdy = 2.821e+001 surface no. 5 ASP rdy = 4.169e+002    k = 7.230e+003    a = 4.457e−004    b = 4.528e−00

TABLE 1-continued surface no. 6 SPH rdy = 1.000e+018 surface no. 7 SPH rdy = 1.000e+018 surface no. 8 XYP

| | | | |
|---|---|---|---|
| Rdy = 1.000e+018 | c3 = −1.174e−004 | c4 = −1.990e−002 | c6 = −1.996e−002 |
| c8 = −2.963e−005 | c10 = −1.476e−004 | c11 = 4.398e−005 | c13 = 7.310e−005 |
| c15 = 9.853e−006 | c17 = 1.203e−006 | c19 = −1.215e−006 | c21 = 8.839e−006 |
| c22 = −1.373e−006 | c24 = −4.098e−006 | c26 = −3.399e−006 | c28 = −8.165e−008 | surface no. 10 SPH rdy = −1.924e+001 surface no. 13 SPH rdy = −1.832e+001 surface no. 14 SPH rdy = 7.962e+000 surface no. 15 SPH rdy = 5.822e+000 surface no. 16 SPH rdy = 7.858e+000

Figure 14A:
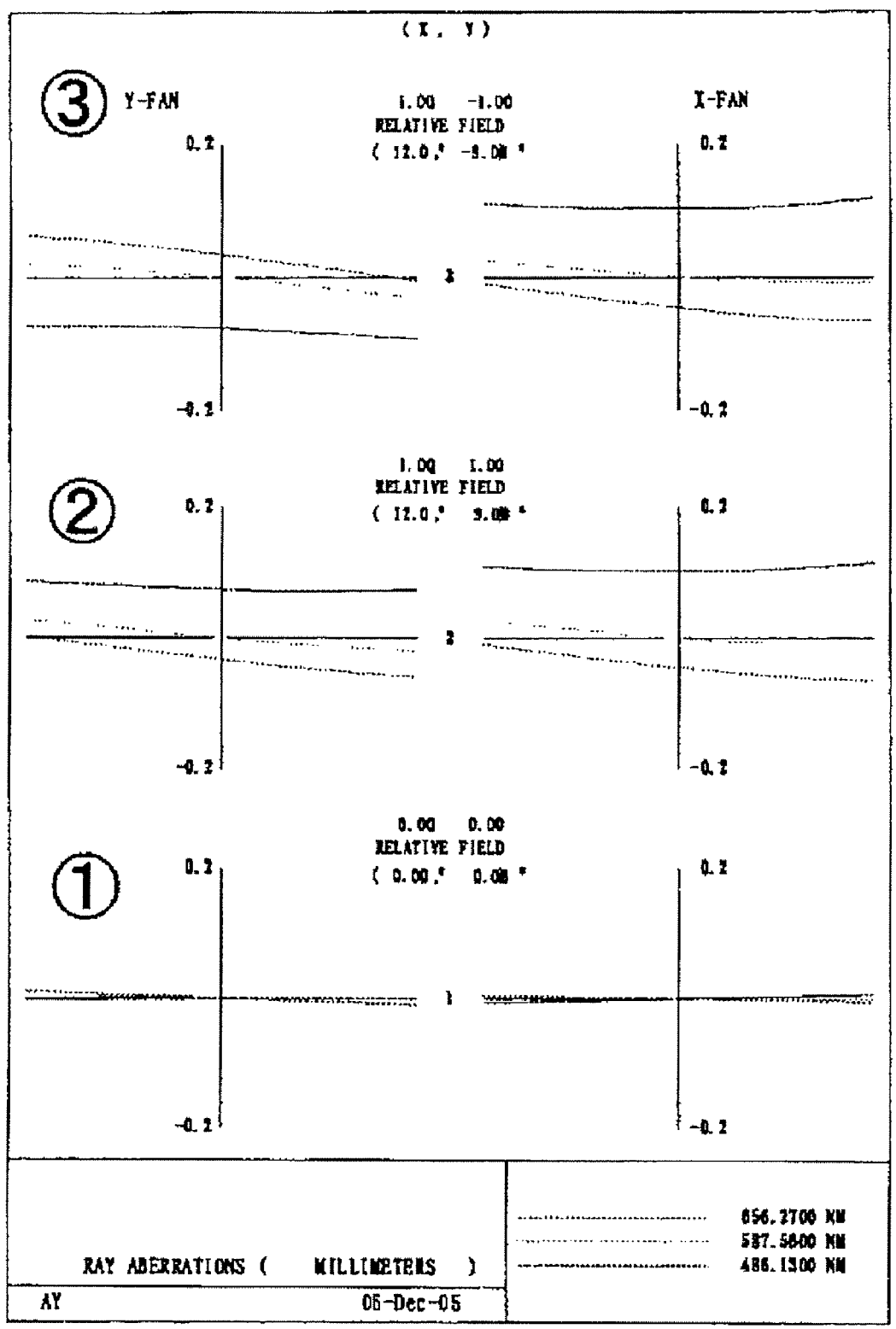
FIG. 14A shows lateral aberration on an image-forming element in Numerical Example 1.
Figure 14B:
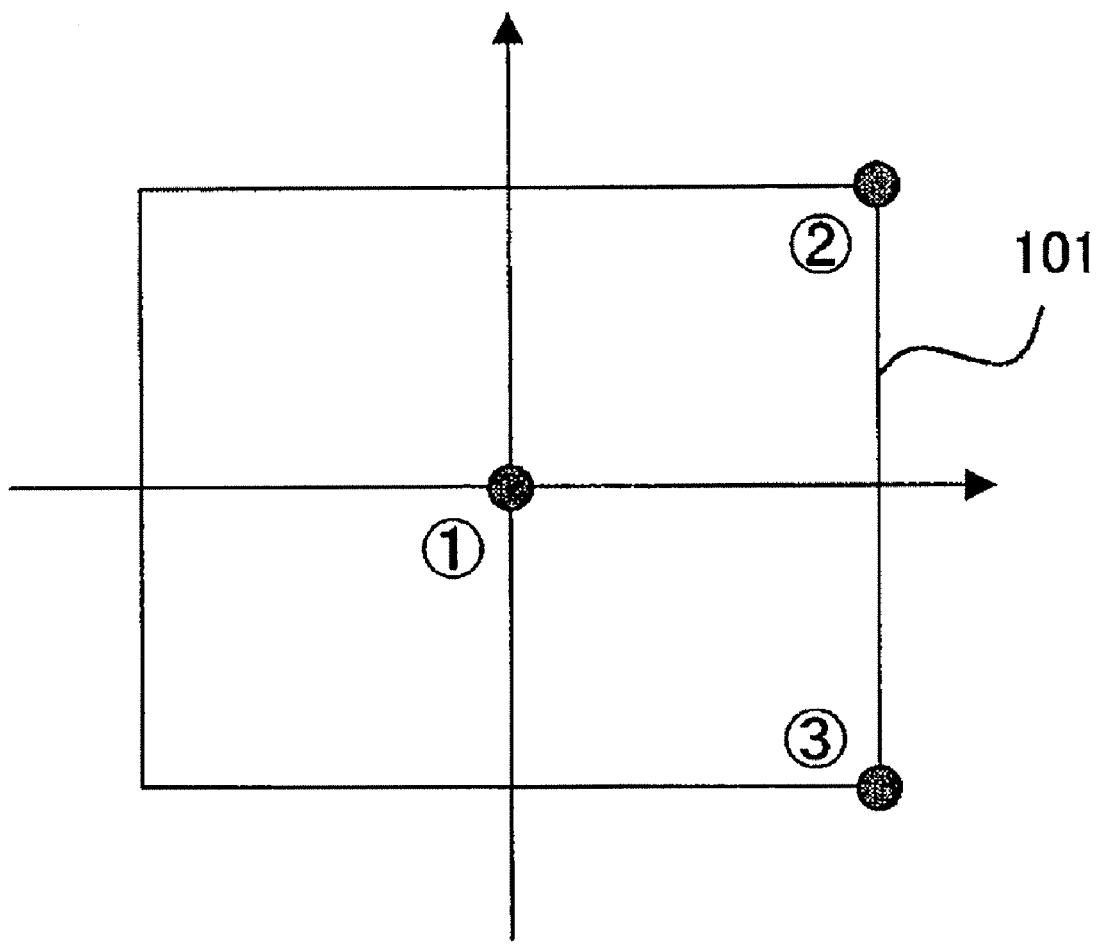
FIG. 14B shows three positions on the image-forming element in Numerical Example 1.
Figure 15:
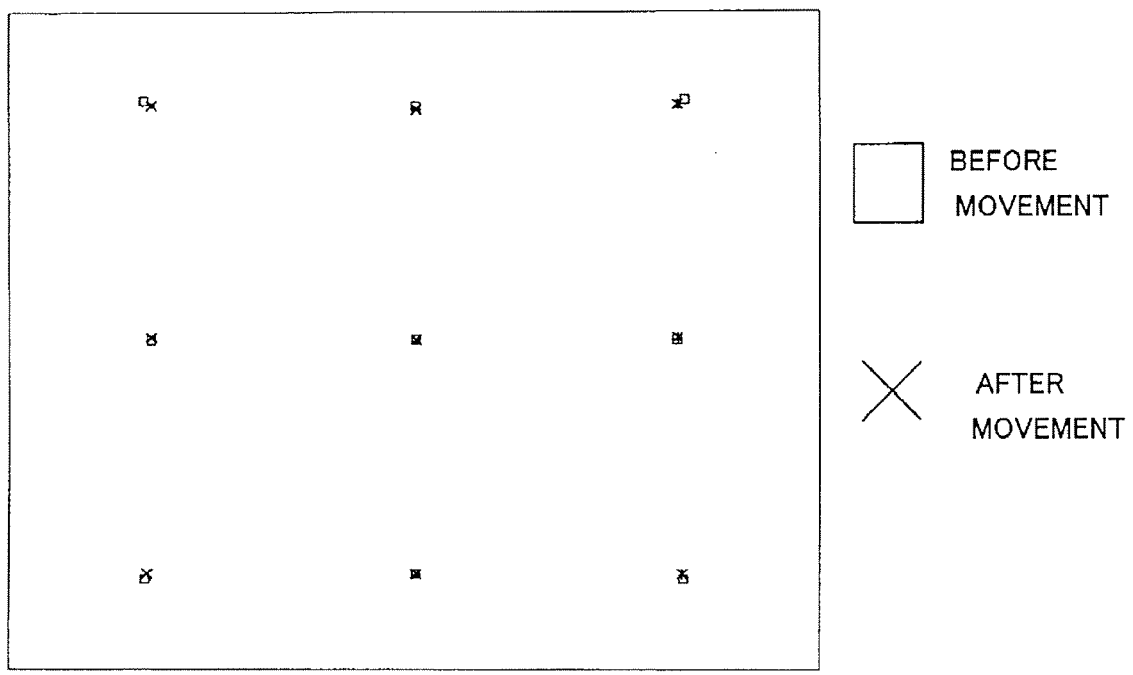
FIG. 15 shows changes in distortion when the exit pupil is moved in Numerical Example 1.

FIG. 14A shows lateral aberration at positions 1 to 3 shown by circled numbers in FIG. 14B on the image-forming element (image-forming surface) 101 of Numerical Example 1. The wavelengths in the aberration diagram are 656.27 nm, 587.56 nm, and 486.13 nm. FIG. 15 shows changes in image distortion when the moving amount of the exit pupil is zero and when the exit pupil is moved by −1.5 mm in the vertical direction in Numerical Example 1.

Numerical Example 2

The diagonal angle of view is 30 degrees, and the aspect ratio is 4:3 (24 degrees horizontal, 18 degrees vertical). The micromirror of the scanning unit (605 in FIG. 6) corresponds to a tenth surface. The vertical scanning angle is ±3.1 degrees when the micromirror is moved in a plane in parallel with the sheet of FIG. 6 about a direction perpendicular to the sheet. The horizontal scanning angle is ±4.1 degrees when the micromirror is moved in a plane perpendicular to the sheet of FIG. 6 about a direction in parallel with the sheet.

The exit pupil diameter is 1 mm. The moving amount of the exit pupil is ±2.4 mm in a direction perpendicular to the sheet of FIG. 1 (hereinafter referred to simply as a horizontal direction) and ±1.5 mm in the vertical direction. In this case, the reflective surface (eighth surface) of the light-flux-deflecting unit (607 in FIG. 6) is rotated by ±2.7 degrees in the vertical direction and by ∓4.2 degrees in the horizontal direction (double signs in same order) about the intersection of the reflective surface and the optical path of the central ray.

The light source has a numerical aperture of 0.16.

Figure 16:
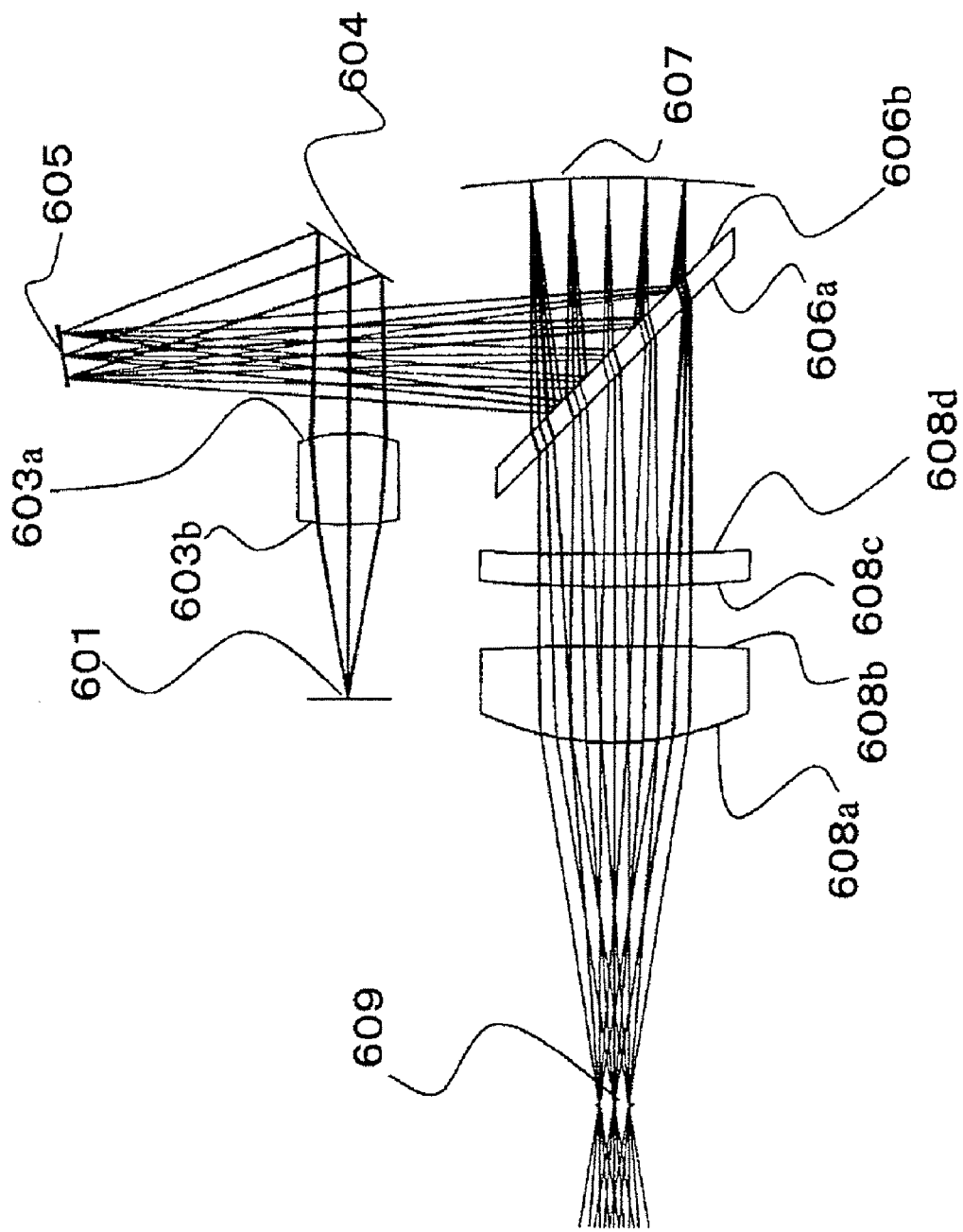
FIG. 16 is a diagram showing optical surfaces in Numerical Example 2 of the present invention.

The correspondence between the components and the surface numbers in Tables will be described with reference to FIG. 16 which shows the same optical system as that in FIG. 6.

exit pupil 609 surface number 1
surface 608*a* surface number 2
surface 608*b* surface number 3
surface 608*c* surface number 4
surface 608*d* surface number 5
surface 606*a* surface number 6
surface 606*b* surface number 7, 9
surface 607 surface number 8
scanning unit 605 surface number 10
surface 604 surface number 11
surface 603*a* surface number 12
surface 603*b* surface number 13
light source 601 surface number 14

TABLE 2

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 12.000 | 0.000 | 0.000 | 1.000 | |
| AL | 2 | 0.0000 | 12.0000 | 0.0000 | 10.8158 | 10.8158 | 3.192 | 0.000 | 0.000 | 1.530 | 55.80 |
| | 3 | 0.0000 | 15.1915 | 0.0000 | −101.5135 | −101.5135 | 2.000 | 0.000 | 0.000 | 1.000 | |
| | 4 | 0.0000 | 17.1915 | 0.0000 | 54.7701 | 54.7701 | 1.100 | 0.000 | 0.000 | 1.530 | 55.80 |
| AL | 5 | 0.0000 | 18.2915 | 0.0000 | 353.6099 | 353.6099 | 5.841 | 0.000 | 0.000 | 1.000 | |
| | 6 | 0.0000 | 24.1321 | 45.0000 | 0.0000 | 0.0000 | 0.989 | 0.000 | 45.00 | 1.516 | 64.14 |
| | 7 | 0.0000 | 25.1209 | 45.0000 | 0.0000 | 0.0000 | 5.610 | 0.000 | 45.00 | 1.000 | |
| XYP-M | 8 | 0.2361 | 30.73071 | 0.0612 | 0.0000 | 0.0000 | −5.610 | 0.236 | 0.061 | −1.000 | |
| M | 9 | 0.0000 | 25.12085 | 45.0000 | 0.0000 | 0.0000 | −0.221 | 0.000 | 45.000 | 1.000 | |
| M | 10 | 18.2318 | 24.8999 | 80.0000 | 0.0000 | 0.0000 | 3.420 | 18.232 | 80.000 | −1.000 | |
| M | 11 | 8.8349 | 28.32012 | 35.0000 | 0.0000 | 0.0000 | −6.000 | 8.835 | 35.000 | 1.000 | |

TABLE 2-continued

| | | | | | | | | | | | | |
|---|---|---|---|---|---|---|---|---|---|---|---|---|
| AL | 12 | 8.8349 | 22.3201 | 0.0000 | 4.4645 | 4.4645 | −3.000 | 8.835 | 0.000 | 1.530 | 55.80 | |
| | 13 | 8.8349 | 19.3201 | 0.0000 | −9.7414 | −9.7414 | −5.870 | 8.835 | 0.000 | 1.000 | | |
| | 14 | 8.8349 | 13.4497 | 0.0000 | 0.0000 | 0.0000 | 0.000 | 8.835 | 0.000 | 1.00 | | | surface no. 2 ASP rdy = 1.082e+001    k = −3.432e−001    a = 6.547e−005    b = 7.426e−007 surface no. 3 SPH rdy = −1.015e+002 surface no. 4 SPH rdy = 5.477e+001 surface no. 5 ASP rdy = 3.536e+002    k = 3.139e+003    a = 2.090e−004    b = 4.669e−006 surface no. 6 SPH rdy = 1.000e+018 surface no. 7 SPH rdy = 1.000e+018 surface no. 8 XYP rdy = 1.000e+018    $c3 = 8.042e-004$    $c4 = -1.405e-002$    $c6 = -1.383e-002$
$c8 = -7.879e-008$    $c10 = -1.132e-006$    $c11 = 3.679e-005$    $c13 = 7.094e-006$
$c15 = -2.253e-005$    $c17 = 1.490e-008$    $c19 = 2.126e-008$    $c21 = 9.929e-008$
$c22 = -1.463e-006$    $c24 = 1.546e-007$    $c26 = 3.309e-007$    $c28 = 2.225e-006$ surface no. 11 SPH rdy = 1.000e+018 surface no. 13 ASP rdy = 4.465e+000    k = −5.764e−001    a = −1.087e−003    b = −2.343e−005
c = −4.022e−006 surface no. 14 SPH rdy = −9.741e+000

Figure 17A:
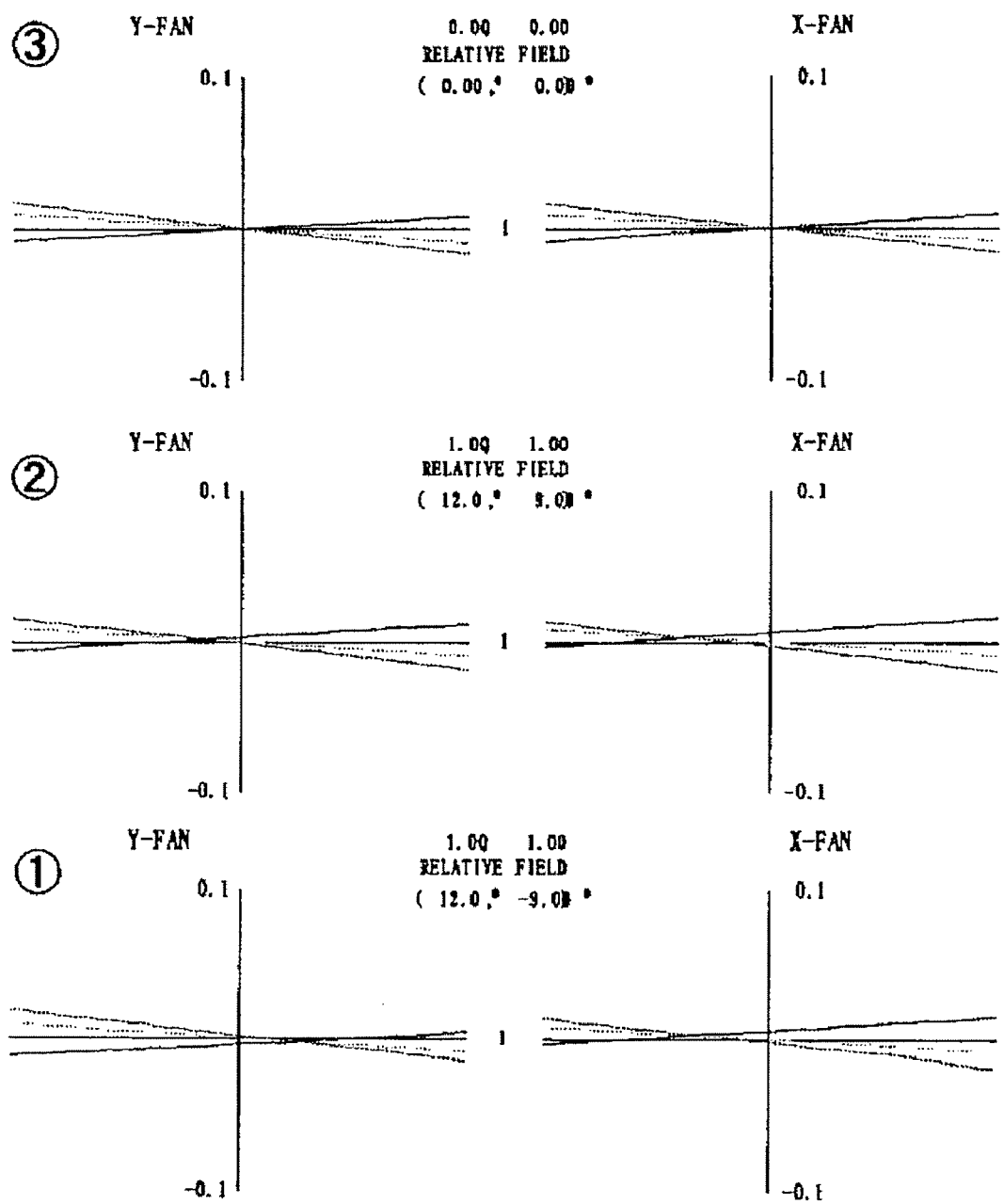
FIG. 17A shows lateral aberration at the position of a light source in Numerical Example 2.
Figure 17B:
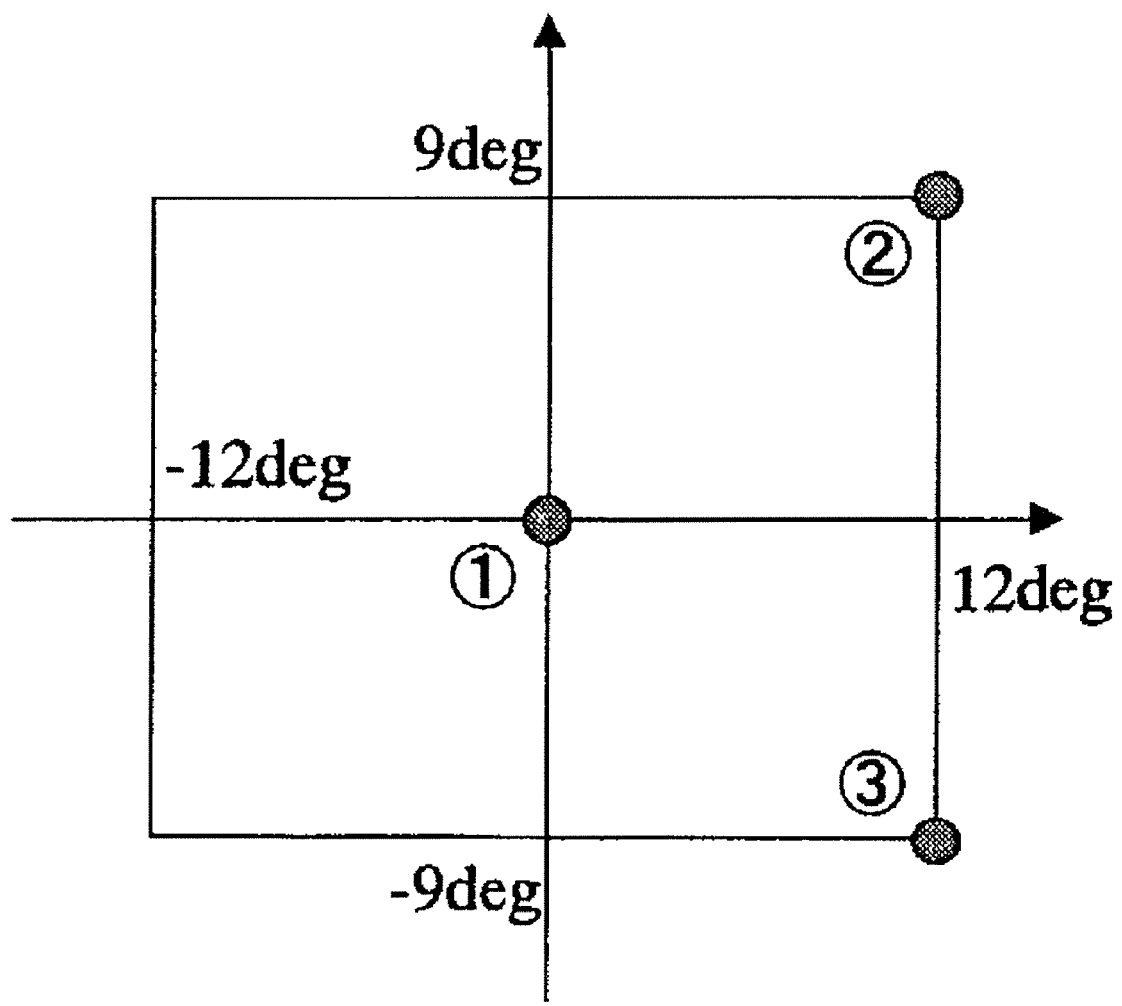
FIG. 17B shows three positions in an angle of view in Numerical Example 2.
Figure 18:
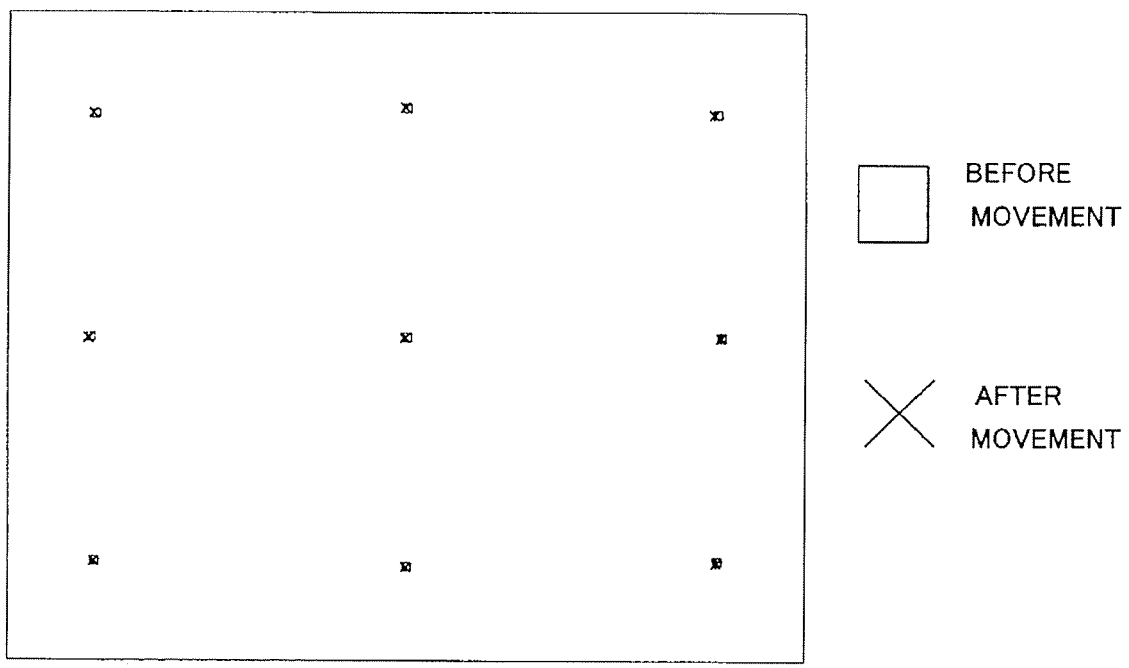
FIG. 18 shows changes in distortion when the exit pupil is moved in Numerical Example 2.

FIG. 17A shows lateral aberration at positions 1 to 3 in the angle of view shown by circled numbers in FIG. 17B at the position of the light source 601 of Numerical Example 2. The wavelengths in the aberration diagram are 656.27 nm, 587.56 nm, and 486.13 nm. FIG. 18 shows changes in image distortion when the moving amount of the exit pupil is zero and when the exit pupil is moved by −1.5 mm in the vertical direction and −2.4 mm in the horizontal direction in Numerical Example 2.

Numerical Example 3

The diagonal angle of view is 75 degrees, and the aspect ratio is 4:3 (60 degrees horizontal, 45 degrees vertical). The scanning unit (905 in FIG. 9) corresponds to a twelfth surface. The vertical scanning angle is ±8.6 degrees. The horizontal scanning angle is ±13.1 degrees.

The exit pupil diameter is 1 mm. The moving amount of the exit pupil is ±4.0 mm in the horizontal direction and ±2.5 mm in the vertical direction. In this case, the reflective surface (seventh surface) of the light-flux-deflecting unit (908 in FIG. 9) is rotated by ∓2.0 degrees in a direction in the sheet and by ±4.2 degrees in a direction perpendicular to the sheet (double signs in same order) about the intersection of the reflective surface and the principal ray.

The light source has a numerical aperture of 0.10.

Figure 19:
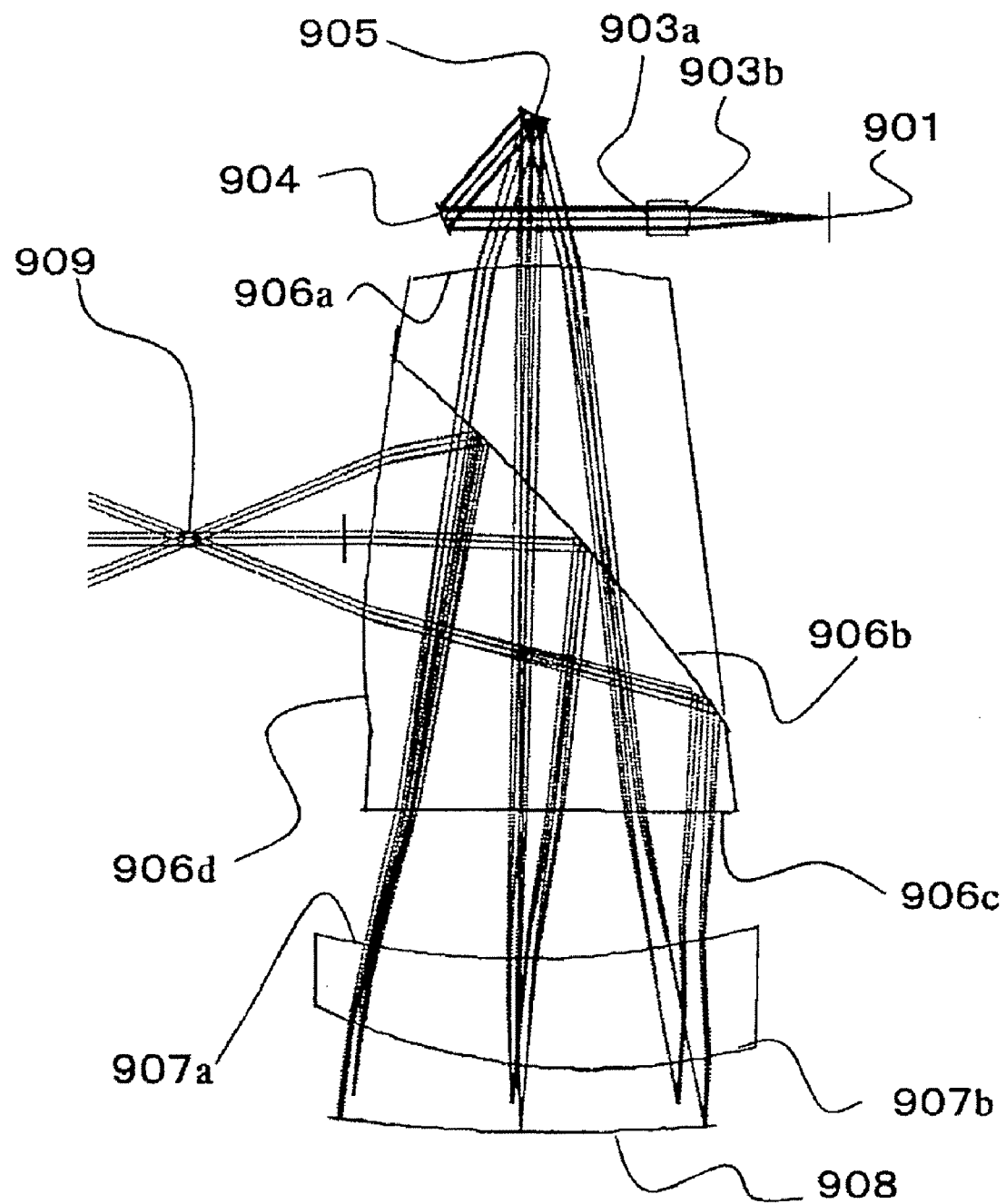
FIG. 19 is a diagram showing optical surfaces in Numerical Example 3 of the present invention.

The correspondence between the components and the surface numbers in Tables will be described with reference to FIG. 19 which shows the same optical system as that in FIG. 9.

| | |
|---|---|
| pupil 909 | surface number 1 |
| surface 906d | surface number 2 |
| surface 906b | surface number 3 |
| surface 906c | surface number 4, 10 |
| surface 907a | surface number 5, 9 |
| surface 907b | surface number 6, 8 |
| surface 908 | surface number 7 |
| surface 906a | surface number 11 |
| scanning unit 905 | surface number 12 |
| surface 904 | surface number 13 |
| surface 903a | surface number 14 |
| surface 903b | surface number 15 |
| light source 901 | surface number 16 |

TABLE 3

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 11.500 | 0.000 | 0.000 | 1.000 | |
| XYP | 2 | −0.5501 | 13.3233 | −3.2154 | 0.0000 | 0.0000 | 13.336 | −0.550 | −3.215 | 1.530 | 55.80 |
| XYP-M | 3 | 2.1107 | 26.6595 | 43.7461 | 0.0000 | 0.0000 | −4.208 | 2.111 | 43.746 | −1.530 | 55.80 |

TABLE 3-continued

Figure 20A:
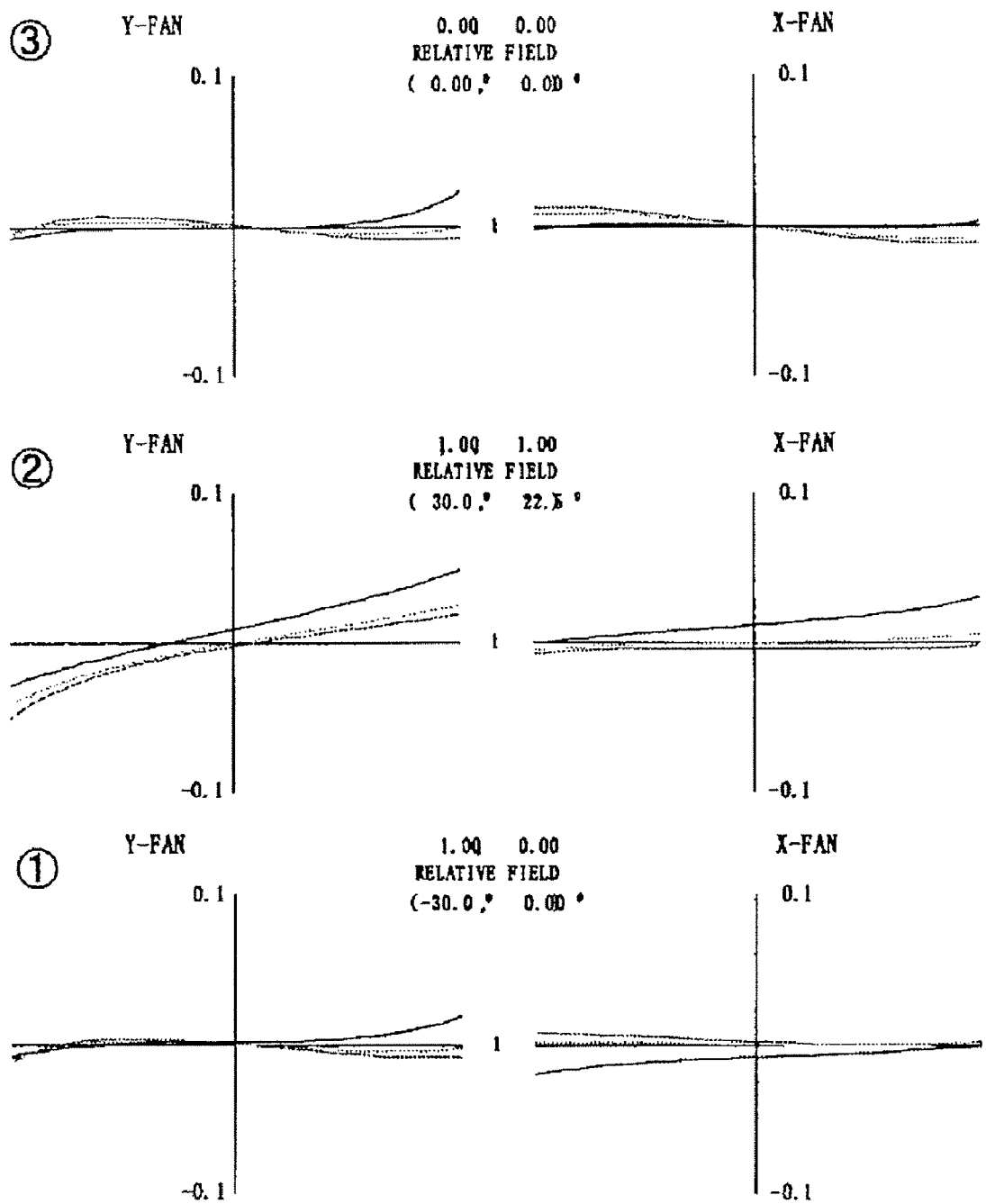
FIG. 20A shows lateral aberration at the position of a light source in Numerical Example 3.
Figure 20B:
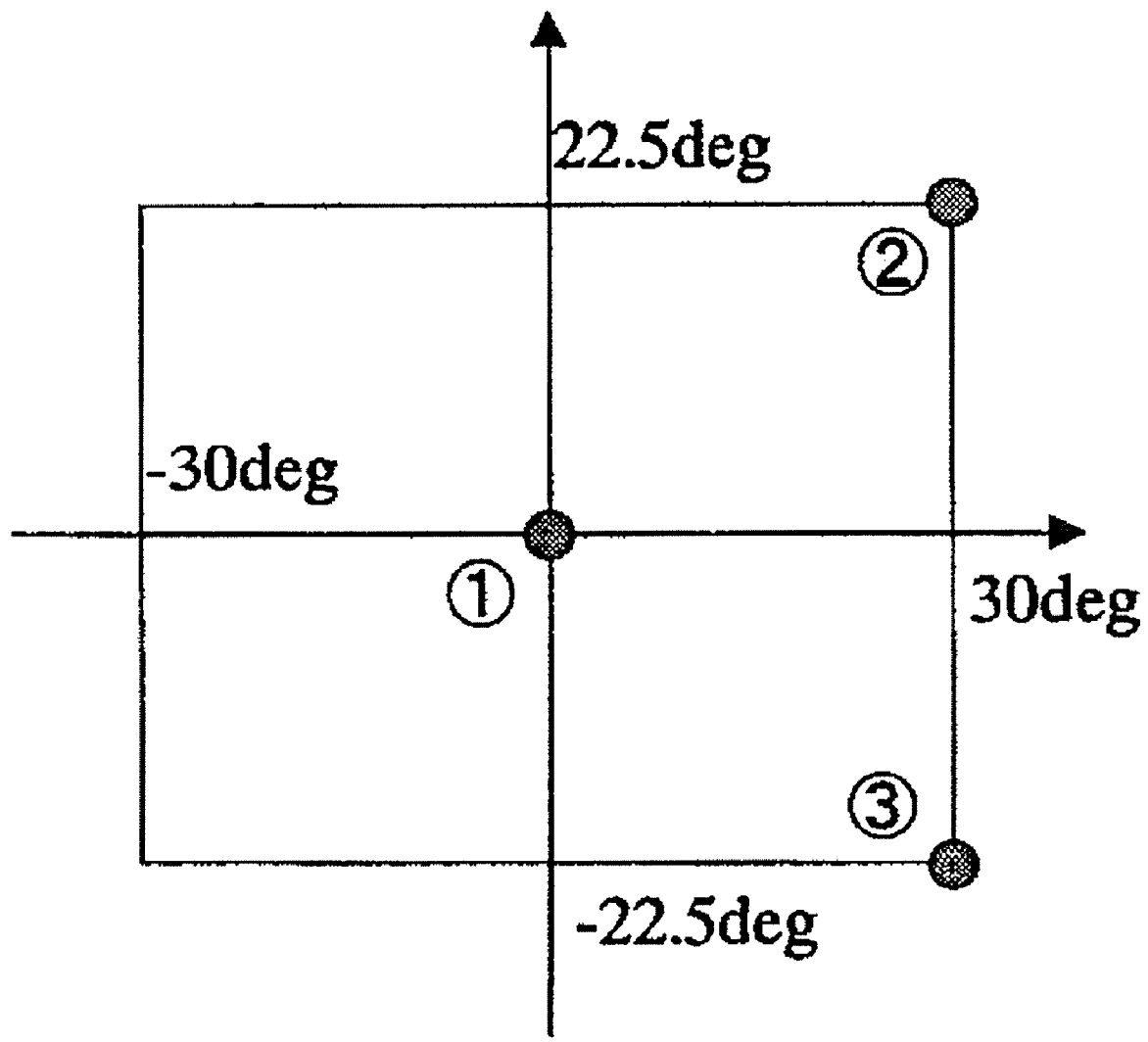
FIG. 20B shows three positions in an angle of view in Numerical Example 3.
Figure 21:
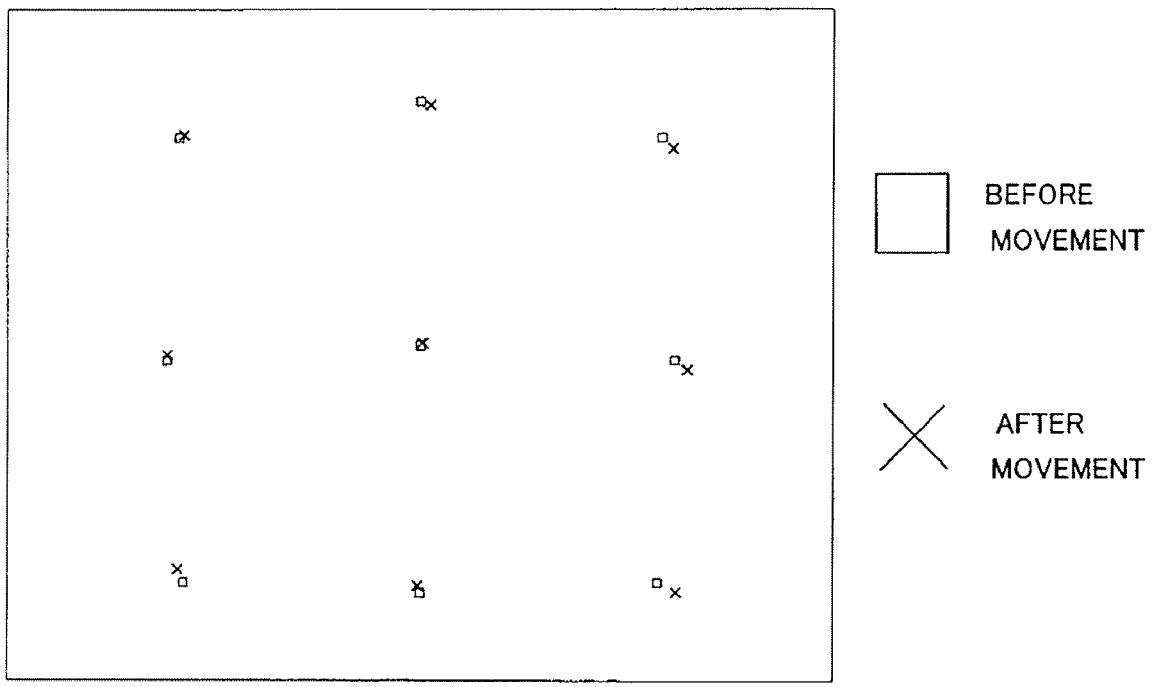
FIG. 21 shows changes in distortion when the exit pupil is moved in Numerical Example 3.

| | | | | | | | | | | |
|---|---|---|---|---|---|---|---|---|---|---|
| XYP | 4 | −19.9522 | 22.4520 | 89.8498 | 0.0000 | 0.0000 | 3.016 | −19.952 | 89.850 | −1.000 | |
| XYP | 5 | −30.8529 | 25.4678 | 89.0684 | 0.0000 | 0.0000 | 2.386 | −30.853 | 89.068 | −1.590 | 31.00 |
| XYP | 6 | −38.9113 | 27.8538 | 88.0557 | 0.0000 | 0.0000 | −3.373 | −38.911 | 88.056 | −1.000 | |
| XYP-M | 7 | −43.6096 | 24.4813 | 89.4802 | 0.0000 | 0.0000 | 3.373 | −43.610 | 89.480 | 1.000 | |
| XYP | 8 | −38.9113 | 27.8538 | 88.0557 | 0.0000 | 0.0000 | −2.386 | −38.911 | 88.056 | 1.590 | 31.00 |
| XYP | 9 | −30.8529 | 25.4678 | 89.0684 | 0.0000 | 0.0000 | −3.016 | −30.853 | 89.068 | 1.000 | |
| XYP | 10 | −19.9522 | 22.4520 | 89.8498 | 0.0000 | 0.0000 | 28.430 | −19.952 | 89.850 | 1.530 | 55.80 |
| XYP | 11 | 13.0671 | 50.8816 | 79.5467 | 0.0000 | 0.0000 | −25.475 | 13.067 | 79.547 | 1.000 | |
| M | 12 | 30.8931 | 25.4066 | 68.4690 | 0.0000 | 0.0000 | −6.630 | 30.893 | 68.469 | −1.000 | |
| M | 13 | 23.4071 | 18.7764 | 24.2345 | 0.0000 | 0.0000 | 15.000 | 23.407 | 24.234 | 1.000 | |
| AL | 14 | 23.4071 | 33.7764 | 0.0000 | 7564.151 | 7564.151 | 3.000 | 23.407 | 0.000 | 1.530 | 58.00 |
| | 15 | 23.4071 | 36.7764 | 0.0000 | −5.1358 | −5.1358 | 10.000 | 23.407 | 0.000 | 1.000 | |
| | 16 | 23.4071 | 46.7764 | 0.0000 | 0.0000 | 0.0000 | 0.000 | 23.407 | 0.000 | 1.000 | | surface no. 2 XYP $rdy = 1.000e+018$   $c3 = 5.230e-002$   $c4 = 1.336e-002$   $c6 = 4.067e-003$
$c8 = -1.102e-004$   $c10 = -2.785e-004$   $c11 = 1.110e-006$   $c13 = -4.084e-006$
$c15 = 5.454e-006$ surface no. 3 XYP $rdy = 1.000e+018$   $c3 = 2.314e-002$   $c4 = -2.763e-003$   $c6 = -3.443e-003$
$c8 = 2.690e-005$   $c10 = -2.208e-005$   $c11 = 3.158e-006$   $c13 = 1.164e-006$
$c15 = -1.305e-007$   $c17 = 5.513e-010$   $c19 = -7.836e-010$   $c21 = -5.571e-012$
$c22 = -1.144e-010$   $c24 = -3.365e-011$   $c26 = 1.928e-011$   $c28 = 1.174e-012$ surface no. 4 XYP $rdy = 1.000e+018$   $c3 = 1.031e-003$   $c4 = -2.858e-004$   $c6 = -2.822e-004$
$c8 = -1.520e-005$   $c10 = -9.126e-006$   $c11 = -8.078e-007$   $c13 = -8.536e-007$
$c15 = -1.019e-008$ surface no. 5 XYP $rdy = 1.000e+018$   $c3 = 5.593e-005$   $c4 = 7.945e-003$   $c6 = 7.951e-003$
$c8 = -1.365e-006$   $c10 = -7.295e-007$   $c11 = 4.969e-007$   $c13 = 9.049e-007$
$c15 = 4.996e-007$ surface no. 6 XYP $rdy = 1.000e+018$   $c3 = -1.086e-004$   $c4 = 1.107e-002$   $c6 = 1.106e-002$
$c8 = 1.310e-006$   $c10 = 4.771e-007$   $c11 = 1.363e-006$   $c13 = 2.821e-006$
$c15 = 1.368e-006$ surface no. 7 XYP $rdy = 1.000e+018$   $c3 = 6.578e-003$   $c4 = 4.855e-003$   $c6 = 3.988e-003$
$c8 = 1.195e-005$   $c10 = 1.876e-005$   $c11 = 5.400e-007$   $c13 = -6.191e-007$
$c15 = 1.390e-007$   $c17 = -5.207e-010$   $c19 = 5.732e-010$   $c21 = 2.709e-010$
$c22 = 7.826e-012$   $c24 = 1.089e-010$   $c26 = 5.951e-011$   $c28 = -3.596e-011$ surface no. 11 XYP $rdy = 1.000e+018$   $c3 = 2.293e-001$   $c4 = -1.441e-002$   $c6 = -1.317e-003$
$c8 = -2.603e-005$   $c10 = -1.665e-004$   $c11 = 1.587e-056$   $c13 = 3.107e-056$
$c15 = 1.553e-056$ surface no. 13 SPH $rdy = 1.000e+018$ surface no. 14 ASP $rdy = 7.564e+003$   $k = -3.964e+009$   $a = -1.264e-003$   $b = -2.486e-005$
$c = 2.138e-004$ surface no. 15 SPH $rdy = -5.136e+000$ FIG. 20A shows lateral aberration at positions 1 to 3 in the angle of view shown by circled numbers in FIG. 20B at the position of the light source 901 of Numerical Example 3. The wavelengths in the aberration diagram are 656.27 nm, 587.56 nm, and 486.13 nm. FIG. 21 shows changes in image distortion when the moving amount of the exit pupil is zero and when the exit pupil is moved by −2.5 mm in the vertical direction and −4.0 mm in the horizontal direction in Numerical Example 3.

Numerical Example 4

The diagonal angle of view is 75 degrees, and the aspect ratio is 4:3 (60 degrees horizontal, 45 degrees vertical). The scanning unit (1104 in FIG. 11B) corresponds to an eighteenth surface. The vertical scanning angle is ±7.5 degrees. The horizontal scanning angle is ±10.0 degrees.

The exit pupil diameter is 1 mm. The moving amount of the exit pupil is ±4.0 mm in the horizontal direction and ±2.5 mm in the vertical direction. In this case, the reflective surface (sixth surface) of the light-flux-deflecting unit (1108 in FIG. 11A) is rotated by ∓2.0 degrees in the vertical direction and by ±4.2 degrees in the horizontal direction (double signs in same order) about the intersection of the reflective surface and the optical path of the central ray.

The light source has a numerical aperture of 0.10.

Figure 22A:
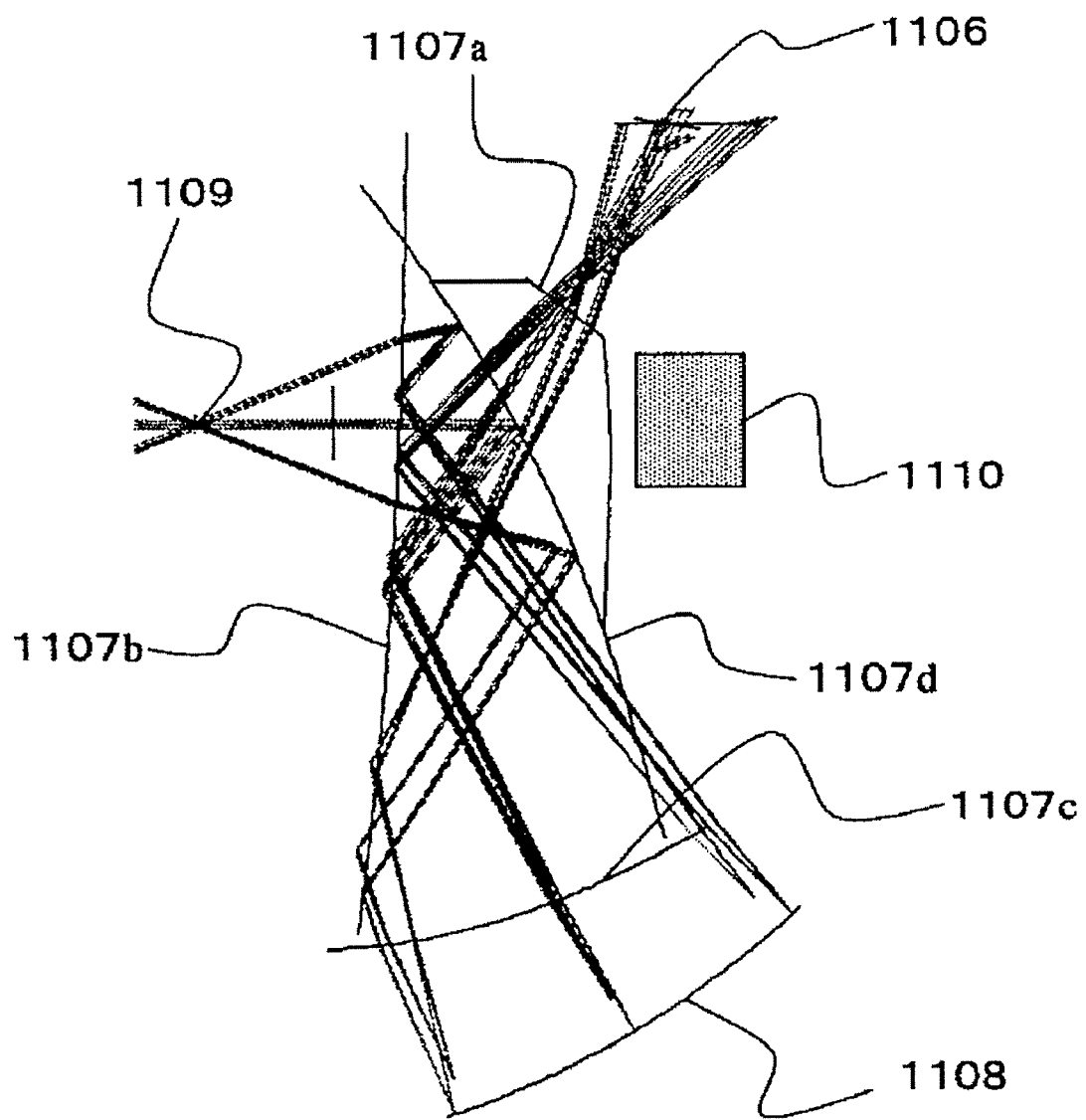
FIG. 22A is a diagram showing optical surfaces in Numerical Example 4 of the present invention.
Figure 22B:
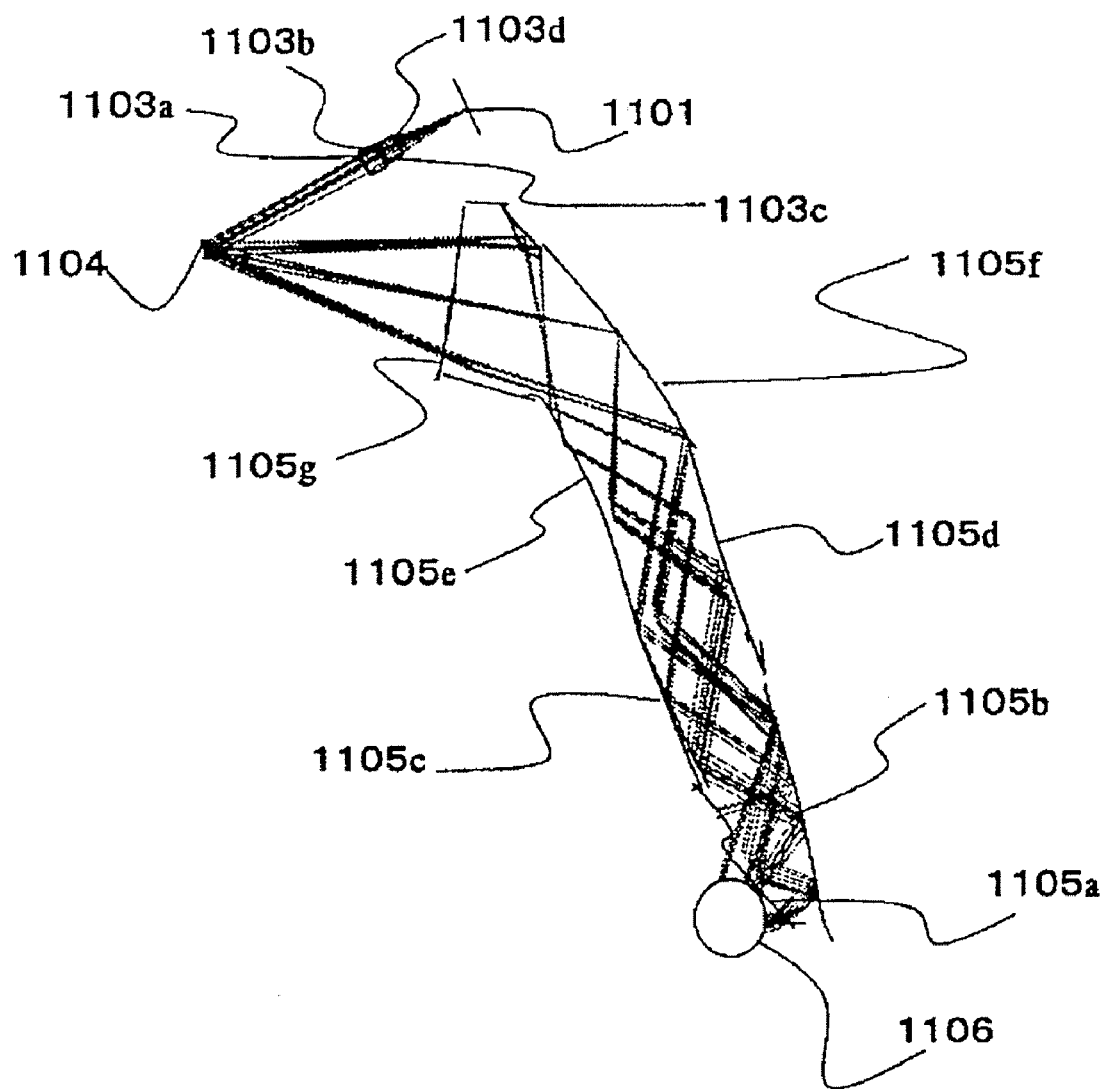
FIG. 22B is a diagram showing optical surfaces in Numerical Example 4.

The correspondence between the components and the surface numbers in Tables will be described with reference to FIGS. 22A and 22B which show the same optical system as that in FIGS. 11A and 11B.

| | |
|---|---|
| pupil 1109 | surface number 1 |
| surface 1107b | surface number 2, 4, 8 |
| surface 1107d | surface number 3 |
| surface 1107c | surface number 5, 7 |
| surface 1108 | surface number 6 |
| surface 1107a | surface number 9 |
| surface 1106 | surface number 10 |
| surface 1105a | surface number 11 |
| surface 1105b | surface number 12 |
| surface 1105c | surface number 13 |
| surface 1105d | surface number 14 |
| surface 1105e | surface number 15 |
| surface 1105f | surface number 16 |
| surface 1105g | surface number 17 |
| scanning unit 1104 | surface number 18 |
| surface 1103a | surface number 19 |
| surface 1103b | surface number 20 |
| surface 1103c | surface number 21 |

TABLE 4

| type | sur | Yg | Zg | θg | ry | rx | d | shift | tilt | nd | vd |
|---|---|---|---|---|---|---|---|---|---|---|---|
| | 1 | 0.0000 | 0.0000 | 0.0000 | 0.0000 | 0.0000 | 10.000 | 0.000 | 0.000 | 1.000 | |
| XYP | 2 | 9.8401 | 15.2652 | −0.0999 | 0.0000 | 0.0000 | 8.568 | 9.840 | −0.100 | 1.530 | 55.80 |
| XYP-M | 3 | −0.5913 | 23.8334 | 27.2493 | 0.0000 | 0.0000 | −8.568 | −0.591 | 27.249 | −1.530 | 55.80 |
| XYP-M | 4 | 9.8401 | 15.2652 | −0.0999 | 0.0000 | 0.0000 | 20.509 | 9.840 | −0.100 | 1.530 | 55.80 |
| XYP | 5 | −30.9096 | 35.7744 | −55.6421 | 0.0000 | 0.0000 | −3.593 | −30.910 | −55.642 | 1.000 | |
| XYP-M | 6 | −44.9576 | 32.1815 | −62.5430 | 0.0000 | 0.0000 | 3.593 | −44.958 | −62.543 | −1.000 | |
| XYP | 7 | −30.9096 | 35.7744 | −55.6421 | 0.0000 | 0.0000 | −20.509 | −30.910 | −55.642 | −1.530 | 55.80 |
| XYP-M | 8 | 9.8401 | 15.2652 | −0.0999 | 0.0000 | 0.0000 | 7.893 | 9.840 | −0.100 | 1.530 | 55.80 |
| | 9 | 11.6618 | 23.1578 | 51.8569 | 0.0000 | 0.0000 | 11.716 | 11.662 | 51.857 | 1.000 | |
| M | 10 | 22.0494 | 34.8742 | 45.0077 | 0.0000 | 0.0000 | 7.231 | 22.049 | 45.008 | −1.000 | |
| XYP | 11 | 22.0450 | 42.1052 | 0.0309 | 0.0000 | 0.0000 | 1.395 | 22.045 | 0.031 | −1.530 | 55.80 |
| XYP-M | 12 | 22.0401 | 43.4997 | 0.0327 | 0.0000 | 0.0000 | −14.368 | 22.040 | 0.033 | 1.530 | 55.80 |
| XYP-M | 13 | 22.0461 | 29.1319 | 0.0331 | 0.0000 | 0.0000 | 8.273 | 22.046 | 0.033 | −1.530 | 55.80 |
| XYP-M | 14 | 22.0379 | 37.4052 | 0.0329 | 0.0000 | 0.0000 | −16.598 | 22.038 | 0.033 | 1.530 | 55.80 |
| XYP-M | 15 | 22.0428 | 20.8072 | 0.0332 | 0.0000 | 0.0000 | 5.694 | 22.043 | 0.033 | −1.530 | 55.80 |
| XYP-M | 16 | 22.0347 | 26.5011 | 0.0332 | 0.0000 | 0.0000 | −31.219 | 22.035 | 0.033 | 1.530 | 55.80 |
| XYP | 17 | 22.0466 | −4.7175 | 0.0259 | 0.0000 | 0.0000 | −34.190 | 22.047 | 0.026 | 1.000 | |
| M | 18 | 22.0621 | −38.9073 | 0.0314 | 0.0000 | 0.0000 | 22.088 | 22.062 | 0.031 | −1.000 | |
| AL | 19 | 22.0476 | −16.8189 | 0.0333 | −7.2226 | −7.2226 | 2.651 | 22.048 | 0.033 | −1.530 | 55.80 |
| | 20 | 22.0459 | −14.1683 | 0.0333 | 4.7101 | 4.7101 | 0.088 | 22.046 | 0.033 | −1.000 | |
| | 21 | 22.0458 | −14.0799 | 0.0333 | 4.7827 | 4.7827 | 2.209 | 22.046 | 0.033 | −1.755 | 27.51 |
| | 22 | 22.0444 | −11.8711 | 0.0333 | 11.5378 | 11.5378 | 9.478 | 22.044 | 0.033 | −1.000 | |
| | 23 | 22.0381 | −2.3927 | 0.0333 | 0.0000 | 0.0000 | 0.000 | 22.038 | 0.033 | −1.000 | | surface no. 2 XYP

| | | | |
|---|---|---|---|
| rdy = 1.000e+018 | c3 = 2.477e−002 | c4 = −3.430e−003 | c6 = −5.383e−004 |
| c8 = 1.116e−005 | c10 = 9.020e−006 | c11 = 1.621e−034 | c13 = −5.542e−025 |
| c15 = −1.363e−024 | c17 = −1.713e−008 | c19 = 5.114e−010 | c21 = −1.370e−010 | surface no. 3 XYP

| | | | |
|---|---|---|---|
| rdy = 1.000e+018 | c3 = 1.363e−002 | c4 = −6.518e−003 | c6 = −4.895e−003 |
| c8 = −3.118e−005 | c10 = −1.401e−005 | c11 = −2.026e−007 | c13 = 8.180e−008 |
| c15 = 5.126e−00 | | | | surface no. 5 XYP

| | | | |
|---|---|---|---|
| rdy = 1.000e+018 | c3 = 1.068e−001 | c4 = −2.068e−003 | c6 = −4.338e−003 |
| c8 = 6.187e−005 | c10 = 1.036e−004 | c11 = 1.621e−034 | c13 = 5.507e−030 |
| c15 = 2.751e−030 | c17 = −1.059e−007 | c19 = 4.997e−008 | c21 = 4.717e−008 | surface no. 6 XYP

| | | | |
|---|---|---|---|
| rdy = 1.000e+018 | c3 = −5.297e−002 | c4 = −7.161e−003 | c6 = −6.833e−003 |

TABLE 4-continued

|  |  |  |  |
|---|---|---|---|
| $c8 = -4.430e-005$ | $c10 = -3.184e-005$ | $c11 = -1.555e-006$ | $c13 = -3.497e-007$ |
| $c15 = -2.839e-007$ | $c17 = 6.396e-008$ | $c19 = -5.765e-008$ | $c21 = 7.987e-008$ |
| $c22 = 1.640e-009$ | $c24 = -8.202e-010$ | $c26 = 1.644e-009$ | $c28 = -2.508e-009$ | surface no. 9 SPH $rdy = 1.000e+018$ surface no. 10 SPH $rdy = 1.000e+018$ surface no. 11 XYP

|  |  |  |  |
|---|---|---|---|
| $rdy = 1.000e+018$ | $c3 = -2.083e-001$ | $c4 = -4.498e-003$ | $c6 = 2.665e-002$ |
| $c8 = -4.337e-004$ | $c10 = -2.352e-004$ | $c11 = -2.436e-004$ | $c13 = -1.912e-004$ |
| $c15 = 8.411e-006$ | $c17 = -7.002e-006$ | $c19 = 7.738e-005$ | $c21 = 1.784e-006$ |
| $c22 = -4.756e-006$ | $c24 = 1.850e-005$ | $c26 = -4.257e-006$ | $c28 = -1.020e-007$ |
| $c30 = -1.120e-005$ | $c32 = 6.843e-006$ | $c34 = 9.456e-007$ | $c36 = -2.260e-008$ |
| $c37 = -6.989e-006$ | $c39 = 4.257e-006$ | $c41 = -1.519e-006$ | $c43 = 1.517e-008$ |
| $c45 = 5.624e-010$ |  |  |  | surface no. 12 XYP

|  |  |  |  |
|---|---|---|---|
| $rdy = 1.000e+018$ | $c3 = -3.794e-002$ | $c4 = 6.840e-003$ | $c6 = 3.797e-003$ |
| $c8 = 5.675e-004$ | $c10 = 9.842e-006$ | $c11 = 5.262e-005$ | $c13 = 1.272e-005$ |
| $c15 = -5.767e-006$ | $c17 = 2.626e-007$ | $c19 = 1.149e-006$ | $c21 = -9.632e-008$ |
| $c22 = -8.871e-008$ | $c24 = -8.140e-007$ | $c26 = 5.613e-008$ | $c28 = 1.389e-008$ |
| $c30 = -9.119e-008$ | $c32 = -3.697e-008$ | $c34 = 5.593e-009$ | $c36 = -1.711e-010$ |
| $c37 = 2.561e-009$ | $c39 = 1.591e-008$ | $c41 = -2.488e-009$ | $c43 = -8.757e-011$ |
| $c45 = -5.168e-011$ |  |  |  | surface no. 13 XYP

|  |  |  |  |
|---|---|---|---|
| $rdy = 1.000e+018$ | $c3 = 5.291e-002$ | $c4 = 7.747e-005$ | $c6 = -1.154e-003$ |
| $c8 = 1.102e-004$ | $c10 = 3.727e-005$ | $c11 = -3.386e-006$ | $c13 = -3.568e-006$ |
| $c15 = 9.011e-007$ | $c17 = 3.523e-006$ | $c19 = -4.145e-007$ | $c21 = 2.097e-008$ |
| $c22 = 6.865e-008$ | $c24 = 2.833e-008$ | $c26 = -3.481e-008$ | $c28 = -6.144e-009$ |
| $c30 = 4.010e-009$ | $c32 = -9.947e-009$ | $c34 = 1.739e-009$ | $c36 = -4.075e-011$ |
| $c37 = 2.766e-009$ | $c39 = 9.683e-010$ | $c41 = -4.240e-010$ | $c43 = 3.780e-011$ |
| $c45 = 5.290e-012$ |  |  |  | surface no. 14 XYP

|  |  |  |  |
|---|---|---|---|
| $rdy = 1.000e+018$ | $c3 = 2.251e-002$ | $c4 = 9.247e-003$ | $c6 = 2.284e-003$ |
| $c8 = -2.169e-004$ | $c10 = 5.152e-005$ | $c11 = 3.963e-006$ | $c13 = 8.500e-006$ |
| $c15 = 8.130e-007$ | $c17 = 2.573e-007$ | $c19 = 6.211e-007$ | $c21 = -2.589e-008$ |
| $c22 = -1.462e-007$ | $c24 = -2.511e-008$ | $c26 = -1.052e-008$ | $c28 = -1.104e-009$ |
| $c30 = -1.508e-009$ | $c32 = -1.134e-009$ | $c34 = -2.592e-010$ | $c36 = -5.511e-011$ |
| $c37 = 4.325e-011$ | $c39 = 3.738e-010$ | $c41 = -2.931e-010$ | $c43 = -4.538e-012$ |
| $c45 = 1.876e-012$ |  |  |  | surface no. 15 XYP

|  |  |  |  |
|---|---|---|---|
| $rdy = 1.000e+018$ | $c3 = 1.202e-002$ | $c4 = 1.025e-002$ | $c6 = 4.938e-003$ |
| $c8 = -6.994e-006$ | $c10 = 4.361e-005$ | $c11 = -1.073e-005$ | $c13 = 2.181e-005$ |
| $c15 = -1.461e-006$ | $c17 = -1.018e-006$ | $c19 = -3.448e-007$ | $c21 = 2.269e-008$ |
| $c22 = -9.825e-009$ | $c24 = -1.872e-008$ | $c26 = 2.823e-008$ | $c28 = -1.858e-010$ |
| $c30 = -2.648e-009$ | $c32 = -1.931e-009$ | $c34 = 1.859e-009$ | $c36 = -1.456e-011$ |
| $c37 = 1.982e-010$ | $c39 = 4.860e-011$ | $c41 = -3.877e-011$ | $c43 = -1.329e-010$ |
| $c45 = -9.345e-013$ |  |  |  | surface no. 16 XYP

|  |  |  |  |
|---|---|---|---|
| $rdy = 1.000e+018$ | $c3 = 2.197e-002$ | $c4 = -2.853e-004$ | $c6 = 3.354e-003$ |
| $c8 = 1.074e-004$ | $c10 = -1.586e-006$ | $c11 = 2.603e-006$ | $c13 = -6.156e-006$ |
| $c15 = 8.250e-007$ | $c17 = 1.972e-007$ | $c19 = 1.477e-007$ | $c21 = -1.911e-008$ |
| $c22 = 6.073e-010$ | $c24 = -1.904e-010$ | $c26 = -4.324e-009$ | $c28 = 1.476e-009$ |
| $c30 = 9.977e-011$ | $c32 = 1.143e-010$ | $c34 = 5.406e-012$ | $c36 = -1.257e-011$ |
| $c37 = -3.426e-011$ | $c39 = 3.385e-012$ | $c41 = 5.762e-012$ | $c43 = 3.046e-013$ |
| $c45 = -7.435e-013$ |  |  |  | surface no. 17 XYP

|  |  |  |  |
|---|---|---|---|
| $rdy = 1.000e+018$ | $c3 = 7.356e-003$ | $c4 = -2.601e-002$ | $c6 = -7.741e-003$ |
| $c8 = -6.734e-004$ | $c10 = 2.680e-004$ | $c11 = -1.577e-005$ | $c13 = -7.501e-006$ |
| $c15 = 3.723e-005$ | $c17 = 1.946e-006$ | $c19 = -1.420e-007$ | $c21 = -3.564e-006$ |
| $c22 = -8.274e-011$ | $c24 = 5.385e-008$ | $c26 = -3.372e-007$ | $c28 = 7.726e-009$ |
| $c30 = 3.359e-009$ | $c32 = 6.264e-009$ | $c34 = -5.145e-009$ | $c36 = -2.097e-009$ |
| $c37 = 8.369e-011$ | $c39 = 1.896e-010$ | $c41 = -9.926e-011$ | $c43 = 8.359e-011$ |
| $c45 = 1.141e-009$ |  |  |  |

TABLE 4-continued

| | surface no. 19 ASP | | |
|---|---|---|---|
| rdy = −7.223e+000 | k = −3.577e−001 | a = −2.475e−005 | b = 4.628e−005 |
| | surface no. 20 SPH | | |
| rdy = 4.710e+000 | | | |
| | surface no. 21 SPH | | |
| rdy = 4.783e+000 | | | |
| | surface no. 22 SPH | | |
| rdy = 1.154e+001 | | | |

Figure 23A:
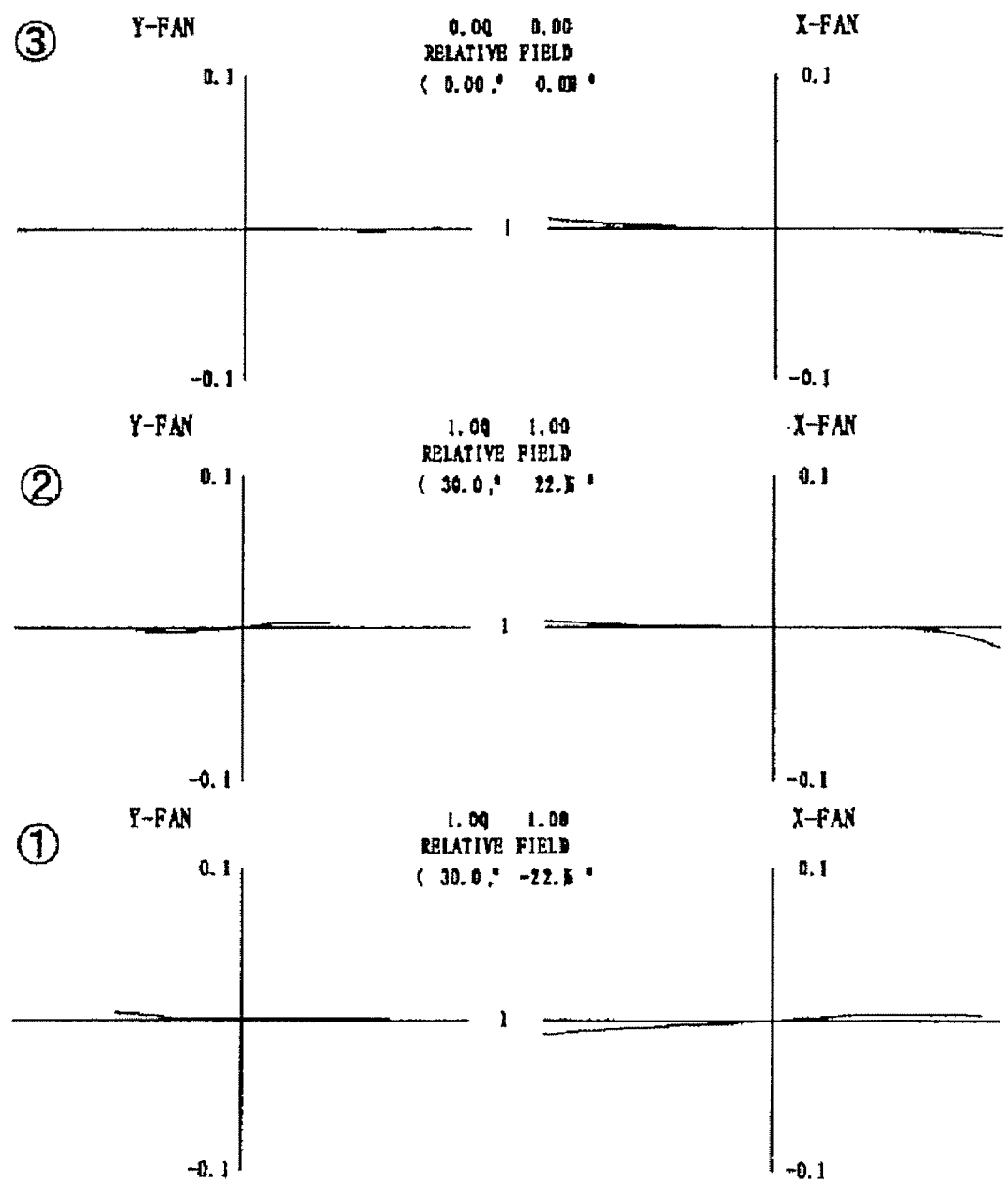
FIG. 23A shows lateral aberration at the position of a light source in Numerical Example 5.
Figure 23B:
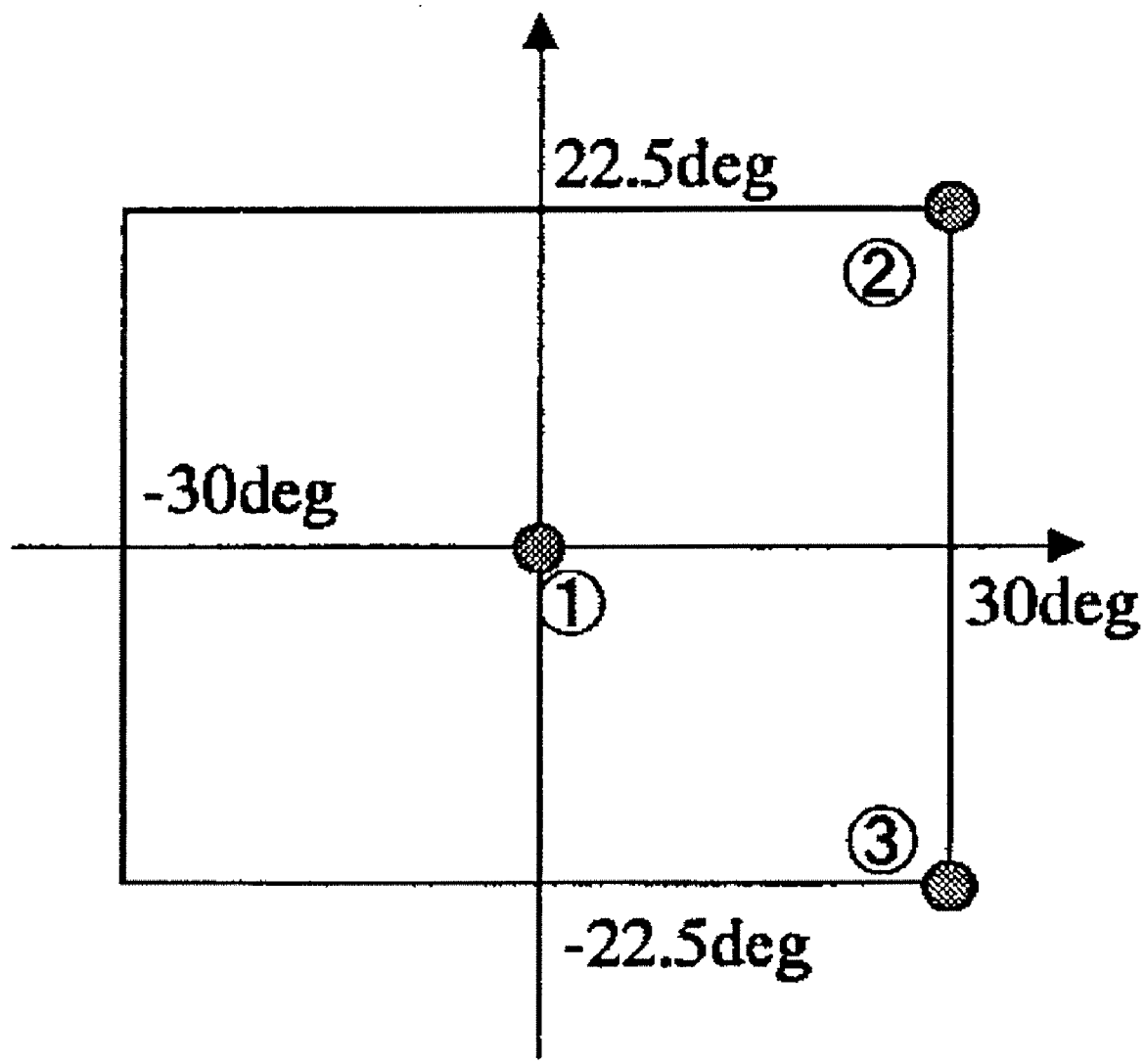
FIG. 23B shows three positions in an angle of view in Numerical Example 4.
Figure 24:
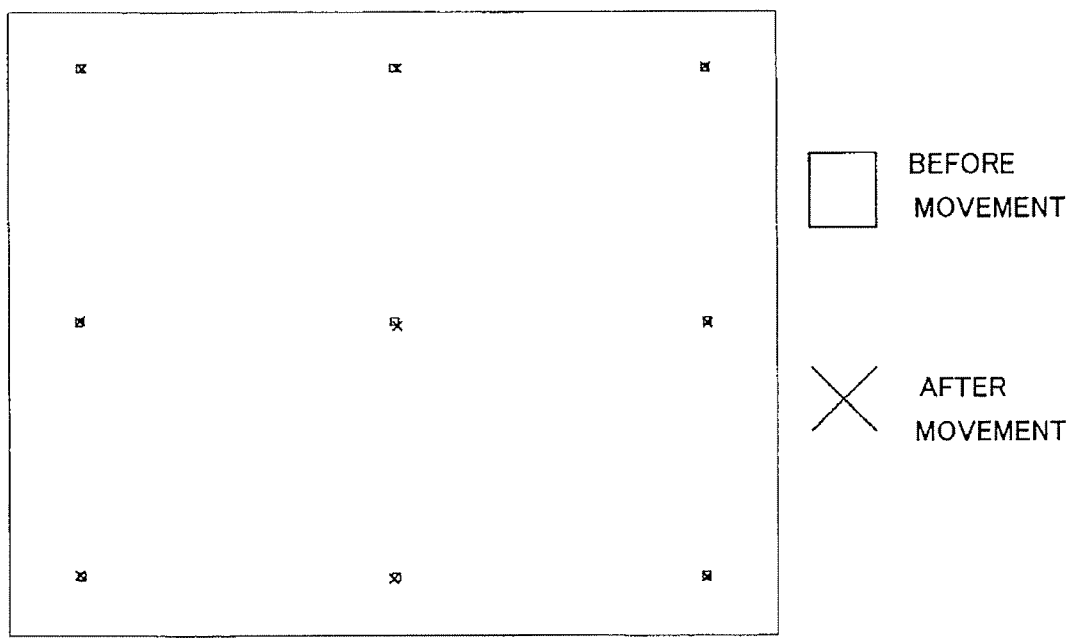
FIG. 24 shows changes in distortion when the exit pupil is moved in Numerical Example 4.

FIG. 23A shows lateral aberration at positions 1 to 3 in the angle of view shown by circled numbers in FIG. 23B at the position of the light source 1101 of Numerical Example 4. The wavelength in the aberration diagram is 587.56 nm. FIG. 24 shows changes in image distortion when the moving amount of the exit pupil is zero and when the exit pupil is moved by −2.5 mm in the vertical direction and −4.0 mm in the horizontal direction in Numerical Example 4.

According to Examples described above, the image display apparatus having a small size and capable of display with high-resolution image can be realized.

An image display system can be formed by electrically connecting the image display apparatus according to Examples 1 to 4 with an image supply apparatus such as a personal computer, a DVD player, and a television tuner for supplying image information to the image display apparatus.

According to the present invention, the optical element rotated to achieve the movement of the exit pupil can be provided with the optical power to reduce variations of image distortion which may occur in moving the exit pupil. The optical element also allows an observer to see an image with aberration corrected favorably in combination with the ocular unit. In addition, the reflective surface provided for the optical element enables a large movement of the exit pupil even with a small movement of the optical element, thereby realizing the image display apparatus having a small size and capable of widely moving the position of the exit pupil.

Furthermore, the present invention is not limited to these embodiments and various variations and modifications may be made without departing from the scope of the present invention.

This application claims foreign priority benefits based on Japanese Patent Application No. 2006-220223, filed on Aug. 11, 2006, which is hereby incorporated by reference herein in its entirety as if fully set forth herein.

What is claimed is:

1. An image display apparatus comprising:
an image-forming element which forms an image;
an ocular unit which causes light from the image-forming element to form an exit pupil; and
an optical element which has an optical power and reflects the light from the image-forming element toward the ocular unit,
wherein, when a central ray is defined as a light ray proceeding from the center of an area of the image-forming element where the light emerges, or is reflected, to the center of the exit pupil, the optical element is rotated about a focal point of the ocular unit on the side closer to the image-forming element which is located on an optical path taken by the central ray to move the exit pupil.

2. The apparatus according to claim 1, wherein the center of the rotation of the optical element is set on a reflective surface of the optical element.

3. The apparatus according to claim 1, wherein the optical element has a positive optical power.

4. The apparatus according to claim 1, wherein the image-forming element is an element which has an image-forming surface on which a two-dimensional image is formed.

5. The apparatus according to claim 1, wherein the image-forming element is an element which two-dimensionally scans light from a light source to form an image.

6. The apparatus according to claim 1, wherein the ocular unit is formed of a light-guiding element having an internal reflective surface which reflects light from the image-forming element, and
wherein the light-guiding element causes the entering light from the image-forming element to emerge toward the optical element, and after the emerging light is reflected by the optical element and then re-enters the light-guiding element, the light-guiding element causes the light emerging therefrom to form the exit pupil.

7. The apparatus according to claim 1, further comprising:
a detector which detects a position of a pupil of an observer; and
a controller which rotates the optical element based on the information on the position detected by the detector.

8. An image display system comprising:
the image display apparatus according to claim 1; and
an image supply apparatus which supplies image information to the image display apparatus.

* * * * *